United States Patent
Shin et al.

(10) Patent No.: US 12,507,211 B2
(45) Date of Patent: Dec. 23, 2025

(54) METHOD AND DEVICE FOR ALLOCATING RESOURCE THROUGH CARRIER AGGREGATION IN V2X SYSTEM

(71) Applicant: SAMSUNG ELECTRONICS CO., LTD., Suwon-si (KR)

(72) Inventors: Cheolkyu Shin, Suwon-si (KR); Hyunseok Ryu, Suwon-si (KR); Sungjin Park, Suwon-si (KR); Jeongho Yeo, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 435 days.

(21) Appl. No.: 17/999,032

(22) PCT Filed: May 17, 2021

(86) PCT No.: PCT/KR2021/006160
§ 371 (c)(1),
(2) Date: Nov. 16, 2022

(87) PCT Pub. No.: WO2021/235803
PCT Pub. Date: Nov. 25, 2021

(65) Prior Publication Data
US 2023/0189218 A1      Jun. 15, 2023

(30) Foreign Application Priority Data
May 18, 2020    (KR) .......................... 10-2020-0059372

(51) Int. Cl.
*H04W 72/02*      (2009.01)
*H04W 72/0453*   (2023.01)
(Continued)

(52) U.S. Cl.
CPC ....... *H04W 72/02* (2013.01); *H04W 72/0453* (2013.01); *H04W 72/25* (2023.01); *H04W 72/563* (2023.01)

(58) Field of Classification Search
CPC . H04W 72/02; H04W 72/0453; H04W 72/25; H04W 72/563
See application file for complete search history.

(56) References Cited

U.S. PATENT DOCUMENTS

| 2019/0082439 A1 | 3/2019 | Krishnamoorthy et al. |
| 2020/0053675 A1 | 2/2020 | Khoryaev et al. |

(Continued)

FOREIGN PATENT DOCUMENTS

| EP | 3672133 A1 | 6/2020 | |
| JP | 2022522390 A | * 4/2022 | ............ H04W 72/20 |

(Continued)

OTHER PUBLICATIONS

International Search Report and Written Opinion of the International Searching Authority dated Aug. 12, 2021, in connection with International Application No. PCT/KR2021/006160, 8 pages.

(Continued)

*Primary Examiner* — Asad M Nawaz
*Assistant Examiner* — Hugh Mark Ashley

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT related technology, such as smart home, smart building, smart city, smart car, connected car, health care, digital education, smart retail, security and safety services. The present disclosure provides a resource selec- (Continued)

tion operation through carrier aggregation in V2X communication.

14 Claims, 21 Drawing Sheets

(51) Int. Cl.
    *H04W 72/25*     (2023.01)
    *H04W 72/563*     (2023.01)

(56) References Cited

U.S. PATENT DOCUMENTS

2020/0068534 A1     2/2020   Li et al.
2020/0205165 A1*   6/2020   Huang ................. H04L 5/0051

FOREIGN PATENT DOCUMENTS

| | | |
|---|---|---|
| KR | 20210003648 A | 1/2021 |
| WO | 2019023857 A1 | 2/2019 |
| WO | 2019090605 A1 | 5/2019 |

OTHER PUBLICATIONS

Huawei et al., "Introduction of 5G V2X with NR sidelink", R2-2001966, 3GPP TSG-RAN WG2 Meeting # 109-e, Feb. 24-Mar. 6, 2020, 491 pages.

Supplementary European Search Report dated Sep. 15, 2023, in connection with European Patent Application No. 21809786.3, 9 pages.

Office Action issued Jun. 26, 2025, in connection with Korean Patent Application No. 10-2020-0059372, 9 pages.

Office Action issued Jul. 9, 2025, in connection with European Patent Application No. 21 809 786.3, 10 pages.

LG Electronics, "Discussion on carrier aggregation in side link mode 4 operation," 3GPP TSG RAN WG1 #92bis, Sanya, China, Apr. 2018, R1-1804510, 4 pages.

Huawei et al., "Sidelink physical layer procedures for Nr V2X," 3GPP TSG RAN WG1 #99, Reno, USA, Nov. 2019, R1-1911887, 30 pages.

* cited by examiner

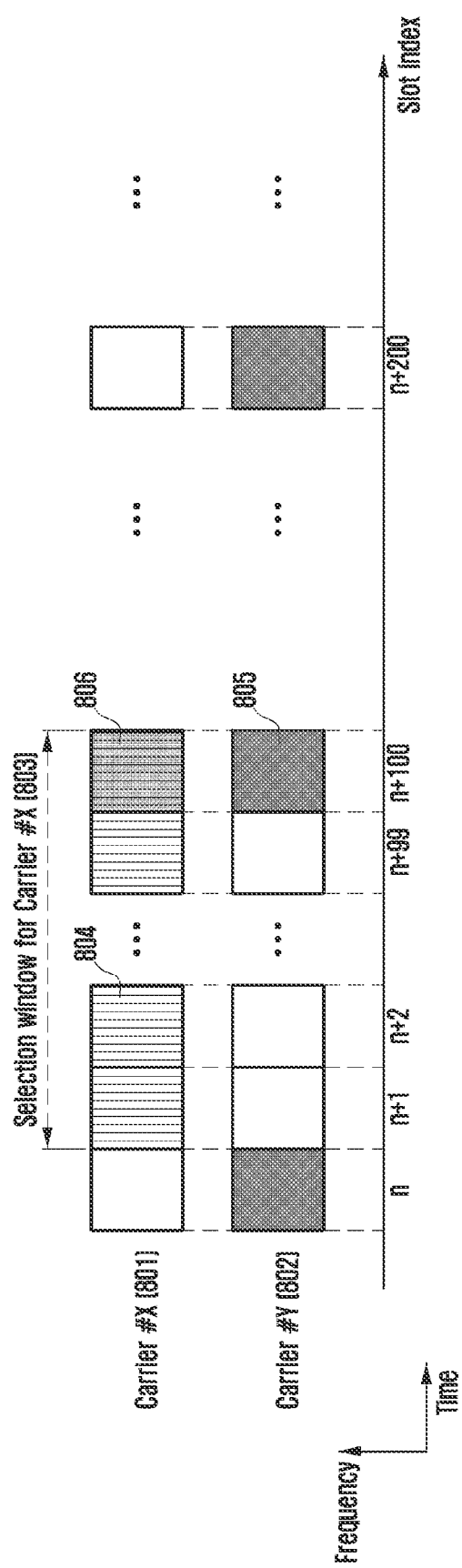

METHOD AND DEVICE FOR ALLOCATING RESOURCE THROUGH CARRIER AGGREGATION IN V2X SYSTEM

CROSS-REFERENCE TO RELATED APPLICATIONS

This application is a 371 of International Application No. PCT/KR2021/006160 filed May 17, 2021, which claims priority to Korean Patent Application No. 10-2020-0059372 filed May 18, 2020, the disclosures of which are herein incorporated by reference in their entirety.

BACKGROUND

1. Field

The disclosure relates to a wireless mobile communication system and, more particularly, to a method and device for resource allocation through carrier aggregation in a process in which a vehicle terminal supporting vehicle-to-everything (V2X) transmits and receives information via a sidelink to and from another vehicle terminal and a portable pedestrian terminal.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the meantime, V2X technology is attracting more attention these days in the 5G communication system.

SUMMARY

The disclosure relates to a wireless communication system and relates to a method and device for selecting transmission resources through carrier aggregation in a process in which a vehicle terminal supporting V2X transmits and receives information via a sidelink to and from another vehicle terminal and a portable pedestrian terminal. Specifically, the disclosure relates to a method of selecting resources according to the transmission and reception capabilities of a terminal in case of performing carrier aggregation in a sidelink, and to terminal operations for maximizing transmission efficiency.

According to an embodiment of the disclosure, a method of a first terminal in a wireless communication system is disclosed. The method may include: identifying a first carrier and a second carrier for sidelink communication; identifying whether at least one symbol included in a slot within a resource selection window of the first carrier is selected for the second carrier; selecting at least one resource for transmitting sidelink data in the resource selection window based on whether the at least one symbol is selected for the second carrier; and transmitting, to a second terminal, the sidelink data through the selected at least one resource.

According to another embodiment of the disclosure, a first terminal in a wireless communication system is disclosed. The first terminal may include: a transceiver; and a controller configured to identify a first carrier and a second carrier for sidelink communication, identify whether at least one symbol included in a slot within a resource selection window of the first carrier is selected for the second carrier, select at least one resource for transmitting sidelink data in the resource selection window based on whether the at least one symbol is selected for the second carrier, and control the transceiver to transmit, a second terminal, the sidelink data to through the selected at least one resource.

The disclosure is to propose a procedure for a terminal to select a resource in sidelink communication. Through the proposed method, the performance of resource allocation can be improved.

BRIEF DESCRIPTION OF THE DRAWINGS

FIG. 8 is a diagram for depicting a method for a UE to select and allocate resources in consideration of the limited UE capability when the UE performs carrier aggregation in the sidelink according to an embodiment of the disclosure.

DETAILED DESCRIPTION

Figure 1:
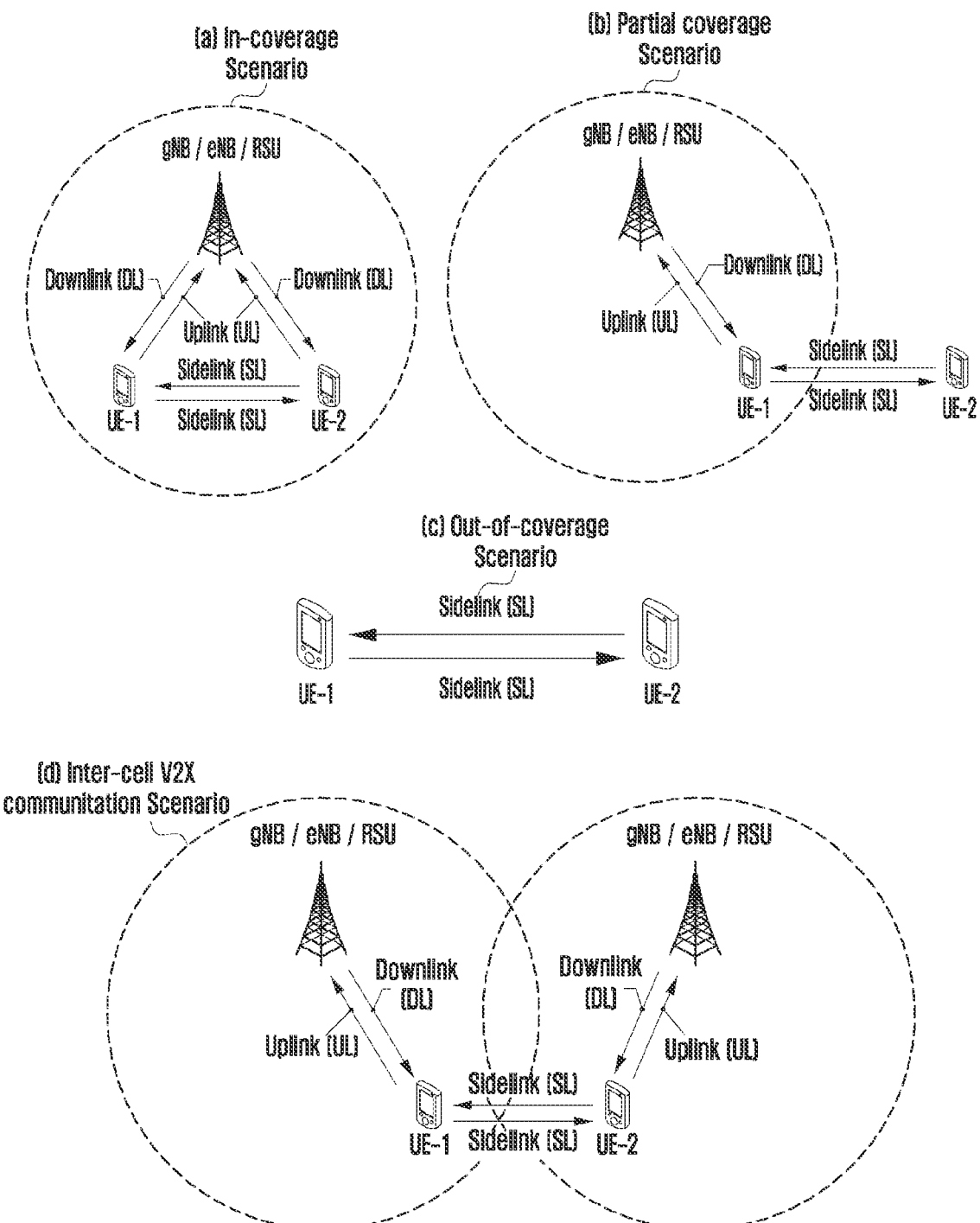
FIG. 1 is a diagram illustrating a system according to an embodiment of the disclosure.

Hereinafter, embodiments of the disclosure will be described in detail with reference to the accompanying drawings.

In the following description of embodiments of the disclosure, descriptions of technical details well known in the art and not directly related to the disclosure may be omitted. This is to more clearly convey the subject matter of the disclosure without obscurities by omitting unnecessary descriptions.

Likewise, in the drawings, some elements are exaggerated, omitted, or only outlined in brief. Also, the size of each element does not necessarily reflect the actual size. The same or similar reference symbols are used throughout the drawings to refer to the same or like parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the description to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Further, each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit", "module", or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Components and units may be implemented to drive one or more processors in a device or a secure multimedia card. Also, in an embodiment, a unit or the like may include one or more processors.

In describing the embodiments of the disclosure in detail, the main focus is placed on the radio access network (new RAN (NR)) and the packet core (5G system, 5G core network, or next generation core (NG core)) being the co network according to the 5G mobile communication standards specified by 3GPP (3rd generation partnership project long term evolution) being a mobile communication standardization organization, but it should be understood by those skilled in the art that the subject matter of the disclosure is applicable to other communication systems having similar technical backgrounds without significant modifications departing from the scope of the disclosure.

In the 5G system, to support network automation, a nets network data collection and analysis function (NWDAF), which is a network function that provides a function to analyze and provide data collected from a 5G network, may be defined. The NWDAF can collect/store/analyze information from the 5G network and provide results to unspecified network functions (NFs), and the analysis results can be used independently by each NF.

Hereinafter, for convenience of description, some terms and names defined in the 3GPP standards (standards of 5G, NR, LTE, or similar systems) may be used. However, the disclosure is not limited by these terms and names, and may be equally applied to systems conforming to other standards.

Additionally, in the following description, terms for identifying access nodes, terms referring to network entities, terms referring to messages, terms referring to interfaces between network entities, and terms referring to various identification information are exemplified for convenience of description. Hence, the disclosure is not limited by the terms used, and other terms referring to entities having equivalent technical meanings may be used.

To meet the ever increasing demand for wireless data traffic since the commercialization of 4G communication systems, efforts have been made to develop improved 5G communication systems (NR, New Radio). To achieve high data rates, the 5G communication system has been designed to support the extremely high frequency (mmWave) band (e.g., 28 GHz frequency band). To decrease path loss of radio waves and increase the transmission distance of radio waves in the mmWave band, various technologies including beamforming, massive multiple-input multiple-output (massive MIMO), full dimensional MIMO (FD-MIMO), array antennas, analog beamforming, and large scale antennas are considered for 5G communication systems. Additionally, unlike LTE, the 5G communication system supports various subcarrier spacings such as 15 kHz, 30 kHz, 60 kHz, and 120 kHz, the physical control channel uses polar coding, and the physical data channel uses low density parity check (LDPC). In addition, not only DFT-S-OFDM but also CP-OFDM are used as a waveform for uplink transmission. While LTE supports HARQ (hybrid ARQ) retransmission in units of transport blocks (TBs), 5G may additionally support HARQ retransmission based on a code block group (CBG) in which several code blocks (CBs) are bundled.

In addition, to improve system networks in 5G communication systems, technology development is under way regarding evolved small cells, advanced small cells, cloud radio access networks (cloud RANs), ultra-dense networks, device-to-device (D2D) communication, wireless backhaul, vehicle communication networks (Vehicle-to-Everything (V2X) networks), cooperative communication, coordinated multi-points (CoMP), interference cancellation, and the like.

Meanwhile, the Internet is evolving from a human centered network where humans create and consume information into the Internet of Things (IoT) where distributed elements such as things exchange and process information. There has also emerged the Internet of Everything (IoE) technology that combines IoT technology with big data processing technology through connection with cloud servers. To realize IoT, technology elements related to sensing, wired/wireless communication and network infrastructure, service interfacing, and security are needed, and technologies interconnecting things such as sensor networks, machine-to-machine (M2M) or machine type communication (MTC) are under research in recent years. In IoT environments, it is possible to provide intelligent Internet technology services, which collect and analyze data created by interconnected things to add new values to human life. Through convergence and combination between existing information technologies and various industries, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, technologies such as sensor networks and machine-to-machine (M2M) or machine type communication (MTC) are being realized by use of 5G communication technologies including beamforming, MIMO, and array antennas. Application of cloud RANs as a big data processing technique described above may be an instance of convergence of 5G technology and IoT technology. In this way, a plurality of services may be provided to the user in a communication system, and to provide such a plurality of services to the user, a method that can provide individual services within the same time interval according to their characteristics and an apparatus using the same are required. Various services provided in the 5G communication system are being investigated, and one of them is a service that satisfies the requirements of low latency and high reliability.

In the case of vehicle communication, the NR V2X system supports unicast communication between UEs, groupcast (or multicast) communication, and broadcast communication. Further, unlike LTE V2X which aims to transmit and receive basic safety information necessary for the vehicle to drive on the road, NR V2X aims to provide more advanced services such as platooning, advanced driving, extended sensor, and remote driving. Also, the NR V2X system supports a method in which the UE directly senses and allocates sidelink transmission resources in consideration of both periodic traffic and aperiodic traffic. In addition, the NR V2X system can support a method of reselecting an already selected resource through additional sensing and can support an operation of reselecting an already reserved resource according to the priority of the corresponding UE and reference signal received power (RSRP) measurement result in order to ensure successful transmission of high-priority traffic or the UE transmitting it.

In particular, when the UE performs resource allocation in the sidelink, carrier aggregation may be considered together. Here, the carrier may mean a specific cell or a specific frequency band, or may be interpreted as a specific frequency range such as bandwidth part (BWP). It should be noted that various interpretations of the meaning of a carrier in the disclosure may be possible other than the above examples. For example, the meaning of a carrier may be interpreted as a resource pool. For a more detailed description of the resource pool, refer to FIG. 3. Here, carrier aggregation may include cases in which transmissions (TX) are simultaneously generated in a plurality of carriers, transmission (TX) and reception (RX) are simultaneously generated, or receptions (RX) are simultaneously generated. Specifically, taking two carriers X and Y as an example, all of the following cases may apply.

carrier X:TX, carrier Y:TX,
carrier X:TX, carrier Y:RX,
carrier X:RX, carrier Y:TX,
carrier X:RX, carrier Y:RX However, when a UE intends to perform carrier aggregation, a case may occur where the terminal cannot support multiple carriers. For example, depending on the limited transmission capability of the UE, the following cases may occur that do not support aggregation of multiple carriers.

In case that the number of TX chains is smaller than the number of transmission carriers configured in the UE,
In case that the UE does not support a given carrier combination,
In case that a TX chain switching time occurs in the UE,
In case that the UE fails to satisfy radio frequency (RF) requirements (for example, it may be caused by power spectral density (PSD) imbalance)

The above examples are a case in which carrier aggregation cannot be performed on a plurality of carriers according to the limited transmission capability of the UE, and cases where carrier aggregation is restricted in the disclosure is not limited to the above examples. As such, for the UE to perform carrier aggregation in the sidelink, it is necessary for the resource selection and allocation method of the UE to consider the limited UE capability. Further, the UE operation in the sidelink for this should be defined. However, there is no discussion related to this. It is noted that the resource selection and allocation method considering carrier aggregation may be applied differently depending on the cases for the limited transmission capability of the UE. The disclosure proposes a method for selecting transmission resources through carrier aggregation in the sidelink.

Embodiments of the present specification are proposed to support the above-described scenario, and aim particularly to provide a method and apparatus for a procedure (mode 2) for a UE to perform sensing and resource selection in the sidelink. In addition, a mode 2 method is proposed for minimizing power consumption of the UE.

FIG. 1 is a diagram illustrating a system according to an embodiment of the disclosure.

With reference to FIG. 1, part (a) of FIG. 1 illustrates a case where all V2X UEs (UE-1 and UE-2) are located within the coverage of the base station (in-coverage, IC). All V2X UEs may receive data and control information through a downlink (DL) from the base station, or transmit data and control information through an uplink (UL) to the base station. Here, the data and control information may be data and control information for V2X communication. Or, the data and control information may be data and control information for regular cellular communication. In addition, the V2X UEs may transmit and receive data and control information for V2X communication through a sidelink (SL).

With reference to FIG. 1, part (b) of FIG. 1 illustrates a case where UE-1 among V2X UEs is located within the coverage of the base station and UE-2 is located outside the coverage of the base station. That is, part (b) of FIG. 1 shows an example of partial coverage (PC) where a specific V2X UE (UE-2) is located outside the coverage of the base station. V2X UE (UE-1) located within the coverage of the base station may receive data and control information through the downlink from the base station, or may transmit data and control information to the base station through the uplink. V2X UE (UE-2) located outside the coverage of the base station cannot receive data and control information from the base station through the downlink, and cannot transmit data and control information to the base station through the uplink. V2X UE (UE-2) may transmit and receive data and control information for V2X communication through a sidelink to and from V2X UE (UE-1).

With reference to FIG. 1, part (c) of FIG. 1 illustrates a case where all V2X UEs are located outside the coverage of the base station (out-of coverage, OOC). Hence, V2X UEs (UE-1, UE-2) cannot receive data and control information from the base station through the downlink, and cannot transmit data and control information to the base station through the uplink. V2X UEs (UE-1, UE-2) may transmit and receive data and control information for V2X communication through the sidelink.

With reference to FIG. 1, part (d) of FIG. 1 illustrates a scenario where V2X UEs (UE-1, UE-2) located in different cells perform V2X communication. Specifically, part (d) of FIG. 1 illustrates a case where V2X UEs (UE-1, UE-2) are connected to different base stations (RRC connected state) or are camping thereon (RRC connection released state, i.e., RRC idle state). Here, V2X UE (UE-1) may be a V2X transmitting UE, and V2X UE (UE-2) may be a V2X receiving UE. Alternatively, V2X UE (UE-1) may be a V2X receiving UE, and V2X UE (UE-2) may be a V2X transmitting UE. V2X UE (UE-1) may receive a system information block (SIB) from the base station to which it is connected (or, on which it is camping), and V2X UE (UE-2) may receive a SIB from another base station to which it is connected (or, on which it is camping). Here, for the SIB, an existing SIB or a SIB defined specifically for V2X may be used. Further, the information of the SIB received by V2X UE (UE-1) and the information of the SIB received by V2X UE (UE-2) may be different from each other. Therefore, for V2X communication between UEs (UE-1, UE-2) located in different cells, information may need to be standardized, or a scheme for interpreting SIB information received from another cell may be additionally required along with information signaling.

For convenience of description, FIG. 1 illustrates a V2X system composed of two V2X UEs (UE-1, UE-2), but communication between more V2X UEs may be made without being limited thereto. In addition, the interface (uplink and downlink) between the base station and the V2X UE may be referred to as a Uu interface, and the sidelink between the V2X UEs may be referred to as a PC5 interface. Hence, these may be used interchangeably in the disclosure. Meanwhile, in the disclosure, the UE may refer to a vehicle supporting vehicle-to-vehicle (V2V) communication, a vehicle or pedestrian handset (i.e., smartphone) supporting vehicle-to-pedestrian (V2P) communication, a vehicle supporting vehicle-to-network (V2N) communication, or a vehicle supporting vehicle-to-infrastructure (V2I) communication. Also, in the disclosure, the UE may refer to a road side unit (RSU) equipped with a UE function, an RSU equipped with a base station function, or an RSU equipped with some of a base station function and some of a UE function.

In addition, according to an embodiment of the disclosure, the base station may be a base station supporting both V2X communication and regular cellular communication or a base station supporting only V2X communication. Here, the base station may be a 5G base station (gNB), a 4G base station (eNB), or an RSU. Hence, in the disclosure, the base station may be referred to as an RSU.

Figure 2:
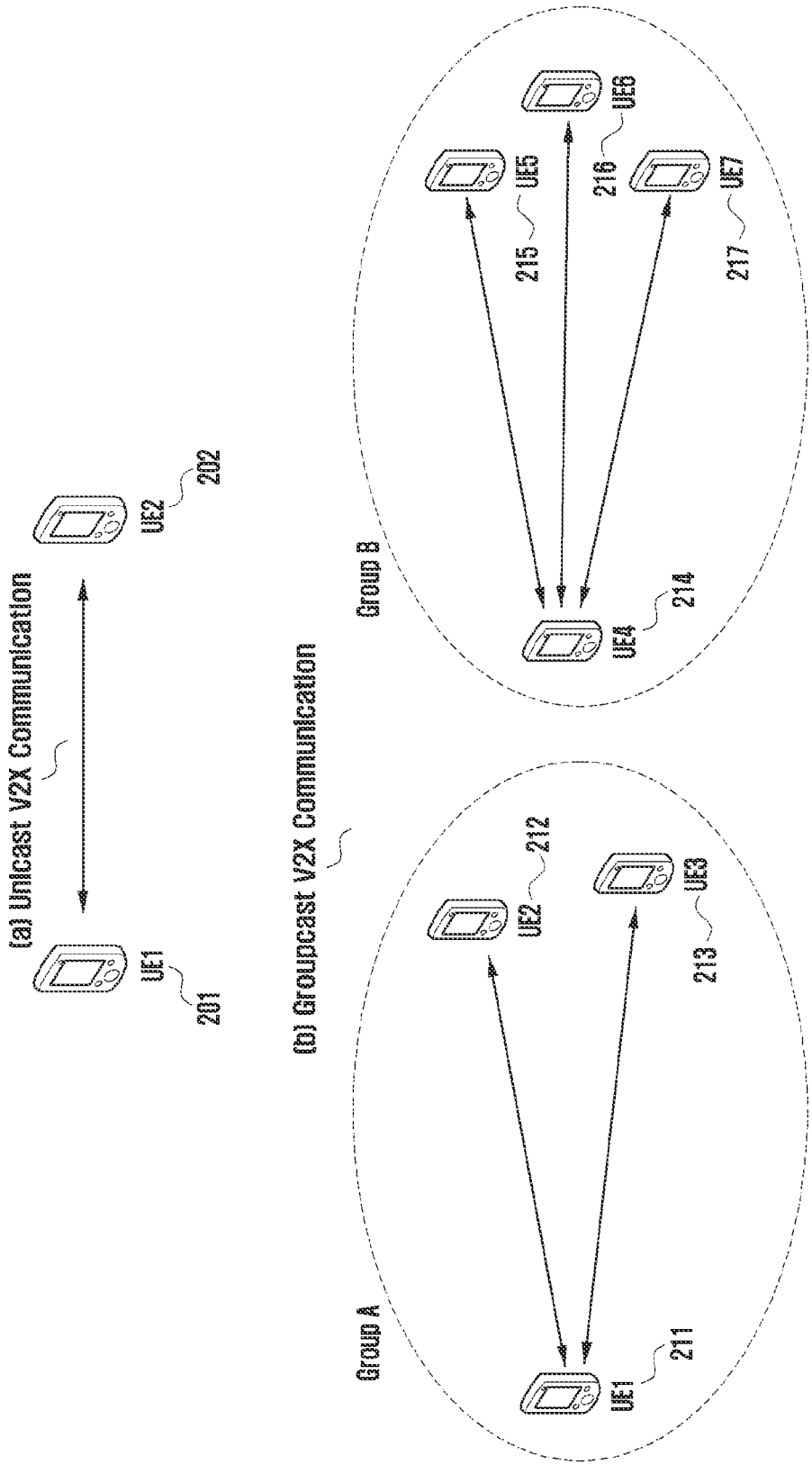
FIG. 2 is a diagram illustrating V2X communication schemes performed through the sidelink according to an embodiment of the disclosure.

FIG. 2 is a diagram illustrating V2X communication schemes performed through the sidelink according to an embodiment of the disclosure.

With reference to part (a) of FIG. 2, UE-1 201 (e.g., TX UE) and UE-2 202 (e.g., RX UE) may perform communication in a one-to-one way, which may be referred to as unicast communication.

With reference to part (b) of FIG. 2, the TX UE and the RX UEs may perform communication in a one-to-many way, which may be referred to as groupcast or multicast. In part (b) of FIG. 2, UE-1 211, UE-2 212, and UE-3 213 form one group (group A) to perform groupcast communication, and UE-4 214, UE-5 215, UE-6 216, and UE-7 217 form another group (group B) to perform groupcast communication. Each UE may perform groupcast communication only within the group to which it belongs, and communication between different groups may be performed through unicast, groupcast, or broadcast. Part (b) of FIG. 2 illustrates formation of two groups (group A, group B) without being limited thereto.

Meanwhile, although not shown in FIG. 2, V2X UEs can perform broadcast communication. Broadcast communication means a case where all V2X UEs receive data and control information transmitted through the sidelink by a V2X TX UE. For example, assuming in part (b) of FIG. 2 that UE-1 211 is a TX UE for broadcasting, all UEs (UE-2 212, UE-3 213, UE-4 214, UE-5 215, UE-6 216, UE-7 217) may receive data and control information transmitted by UE-1 211.

In NR V2X, unlike LTE V2X, it is possible to consider both support in the form where a vehicle UE transmits data to only one specific node through unicast, and support in the form where a vehicle UE, transmits data to multiple specified nodes through groupcast. For example, in a service scenario such as platooning, which is a technology that connects two or more vehicles in a single network to move them together in a cluster, these unicast and groupcast may be valuably used. Specifically, unicast communication may be required for the purpose of controlling one specific node by the leader node of the group connected through platooning, and groupcast communication may be required for the purpose of simultaneously controlling the group composed of multiple specified nodes.

Figure 3:
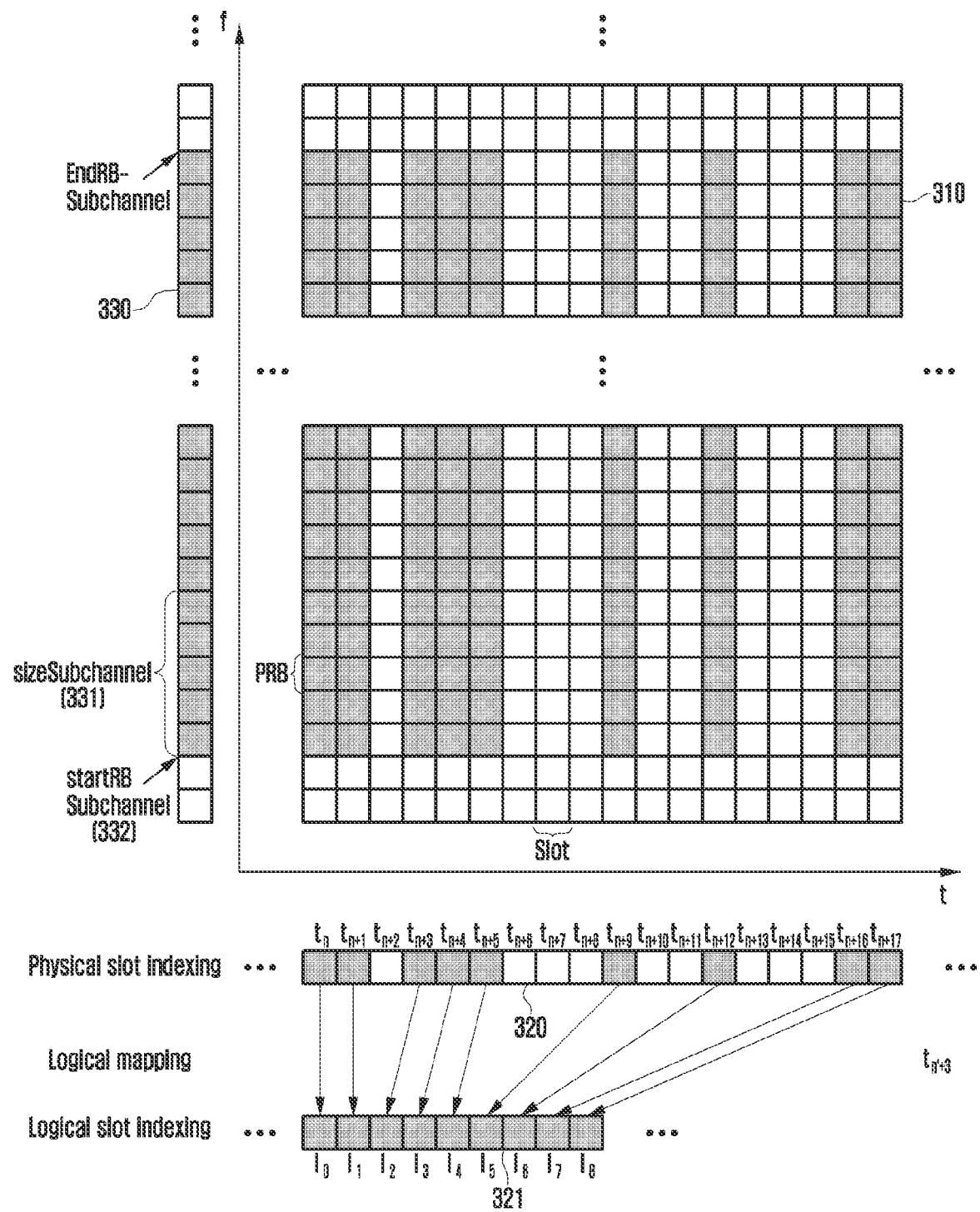
FIG. 3 is a diagram illustrating a resource pool defined as a set of resources in the time and frequency domain used for sidelink transmission and reception according to an embodiment of the disclosure.

FIG. 3 is a diagram illustrating a resource pool defined as a set of resources in the time and frequency domain used for sidelink transmission and reception according to an embodiment of the disclosure.

In the resource pool, the unit of resource allocation (resource granularity) in the time domain may be a slot. In addition, the resource allocation unit in the frequency domain may be a sub-channel composed of one or more physical resource blocks (PRBs).

In the case of allocation of a resource pool in the time and frequency domain (310), the shaded region indicates the region configured as a resource pool in the time and frequency domain. In the disclosure, a case in which a resource pool is non-contiguously allocated in the time domain is described for illustration, but a resource pool may be contiguously allocated in the time domain. Further, in the disclosure, a case in which a resource pool is contiguously allocated in the frequency domain is described for illustration, but it does not exclude a case in which a resource pool is non-contiguously allocated in the frequency domain.

With reference to FIG. 3, a case 320 in which a resource pool is non-contiguously allocated in the time domain is illustrated. FIG. 3 illustrates a case in which the granularity of time domain resource allocation is a slot. Specifically, one slot composed of plural OFDM symbols may be a basic unit of resource allocation in the time domain. Here, all OFDM symbols constituting the slot may be used for sidelink transmission, or some of the OFDM symbols constituting the slot may be used for sidelink transmission. For example, a portion of the slot may be used in the downlink/uplink served as the Uu interface between the base station and the UE. In FIG. 3, a shaded slot indicates a slot included in the resource pool in the time domain, and the slots assigned to the resource pool may be (pre-)configured as time domain resource pool information. For example, the time domain resource pool information may be indicated by a bitmap through the SIB.

With reference to FIG. 3, physical slots 320 belonging to a resource pool that is non-contiguous in the time domain may be mapped to logical slots 321. In general, a set of slots belonging to a physical sidelink shared channel (PSSCH) resource pool may be represented by (t0, t1, . . . , ti, . . . , tTmax).

FIG. 3 illustrates a case 330 in which a resource pool is contiguously allocated in the frequency domain.

Frequency domain resource allocation may be performed in units of sub-channels 331. The sub-channel 331 may be defined as a resource allocation unit composed of one or more RBs in the frequency domain. That is, the sub-channel 331 may be defined as an integer multiple of RB. With reference to FIG. 3, the sub-channel 331 may be composed of five consecutive PRBs, and the sub-channel size (sizeSubchannel) may be the size of five consecutive PRBs. However, the details shown in the drawing are only an example of the disclosure; the size of a sub-channel may be set differently, and it is common that one sub-channel is composed of consecutive PRBs, but it is not necessarily composed of consecutive PRBs. The sub-channel 331 may be a basic unit of resource allocation for the PSSCH.

startRB-Subchannel 332 may indicate the start position of the sub-channel 331 in the frequency domain of the resource pool. When frequency domain resource allocation is performed in units of sub-channels 331, frequency domain resources may be allocated by using configuration information related to the RB index where the sub-channel 331 starts (startRB-Subchannel 332), information on the number of RBs constituting the sub-channel 331 (sizeSubchannel), and a total number of sub-channels 331 (numSubchannel). Here, the information regarding startRB-Subchannel, sizeSubchannel, and numSubchannel may be (pre-)configured as frequency domain resource pool information. For example, the frequency resource pool information may be configured and indicated through the SIB.

Figure 4:
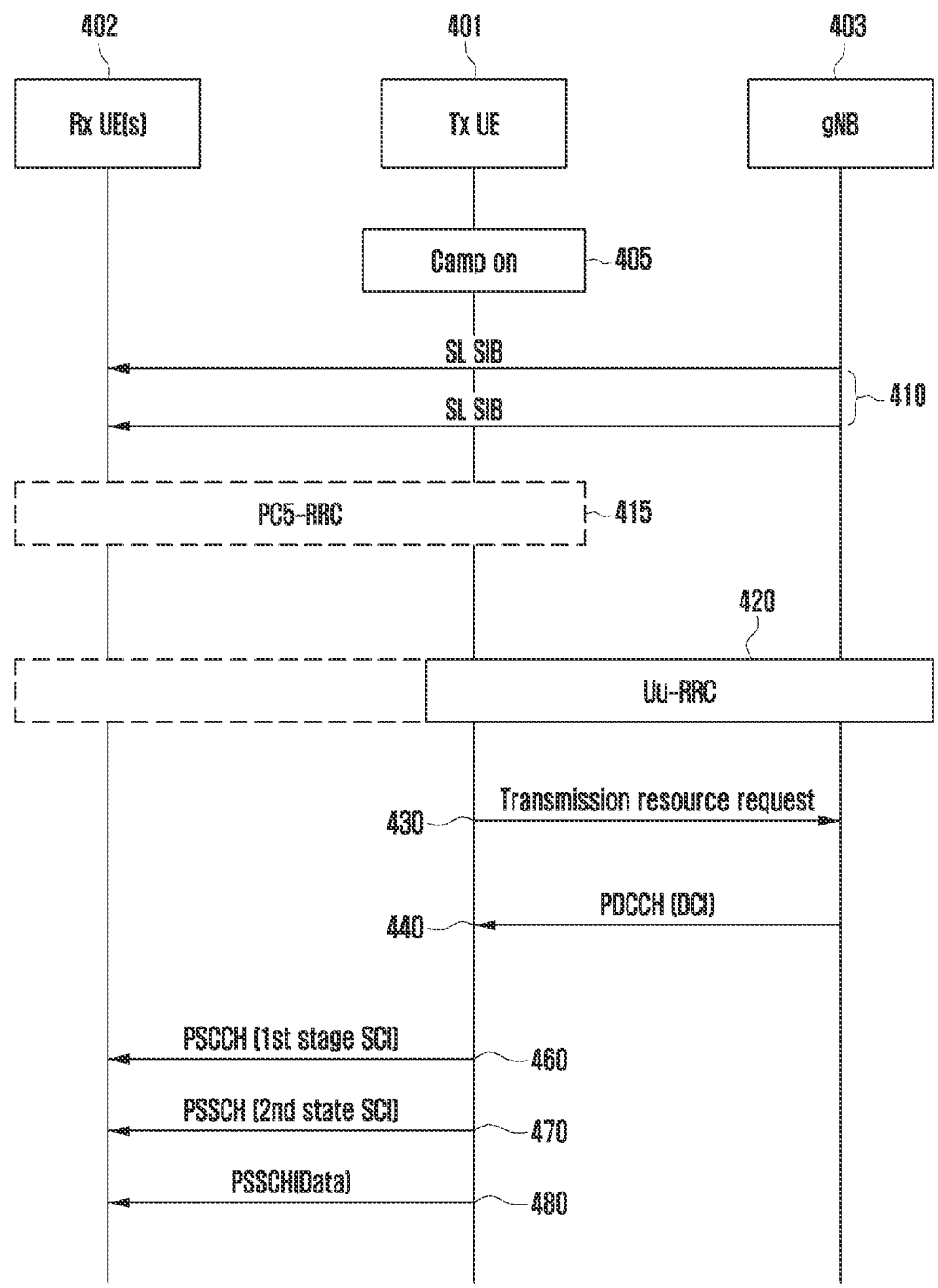
FIG. 4 is a diagram illustrating a method for a base station to allocate transmission resources in the sidelink according to an embodiment of the disclosure.

FIG. 4 is a diagram illustrating a method for a base station to allocate transmission resources in the sidelink according to an embodiment of the disclosure.

The method for the base station to allocate transmission resources in the sidelink will be referred to as mode 1 hereinafter. Mode 1 may be scheduled resource allocation, Mode 1 may indicate a method in which the base station allocates resources used for sidelink transmission to RRC-connected terminals in a dedicated scheduling scheme. The mode 1 method can be effective for interference management and resource pool management because the base station can manage sidelink resources.

With reference to FIG. 4, the TX UE 401 in camping state (405) and the RX UE 402 may receive a sidelink system information block (SL-SIB) from the base station 403 (410). Here, the RX UE 402 indicates a UE that receives data transmitted by the TX UE 401. The SL-SIB information may include sidelink resource pool information for sidelink transmission/reception, parameter setting information for sensing operation, information for setting sidelink synchronization, or carrier information for sidelink transmission and reception operating at different frequencies.

When data traffic for V2X is generated in the TX UE 401, the transmitting UE 401 may be RRC-connected to the base station 403 (420). Here, the RRC connection between the UE and the base station may be referred to as Uu-RRC. The Uu-RRC connection process (420) may be performed before generation of data traffic in the TX UE 401. Also, in mode 1, in a state where the Uu-RRC connection process (420) between the base station 403 and the RX UE 402 has been performed, the TX UE may perform transmission to the RX UE through the sidelink. Unlike this, in mode 1, even when the Uu-RRC connection process (420) between the base station 403 and the RX UE 402 is not performed, the TX UE may perform transmission to the RX UE through the sidelink.

The TX LT 401 may request a transmission resource from the base station to perform V2X communication with the RX UE 402 (430). Here, the TX UE 401 may request a sidelink transmission resource from the base station 403 by using the physical uplink control channel (PUCCH), an RRC message, or a MAC CE. Meanwhile, the MAC CE may be a buffer status report (BSR) MAC CE in a new format (including at least an indicator indicating a buffer status report for V2X communication and information about the size of data buffered for D2D communication). Further, the TX UE 401 may request a sidelink resource through scheduling request (SR) bits transmitted on the physical uplink control channel.

Then, the base station 403 may allocate a V2X transmission resource to the TX UE 401. Here, the base station may allocate transmission resources by using a dynamic grant scheme or a configured grant scheme.

First, in the case of the dynamic grant scheme, the base station may allocate resources for TB transmission through downlink control information (DCI). The sidelink scheduling information included in the DCI may include parameters related to transmission occasions for initial transmission and retransmission, and frequency allocation location information. The DCI for the dynamic grant scheme may be CRC scrambled with SL-V-RNTI to indicate the dynamic grant scheme.

Next, in the case of the configured grant scheme, the base station may periodically allocate resources for TB transmission by setting a semi-persistent scheduling (SPS) interval through Uu-RRC. In this case, the base station may allocate resources for one TB through the DCI. The sidelink scheduling information for one TB included in the DCI may include parameters related to transmission occasions for initial transmission and retransmission resources, and frequency allocation location information. When resources are allocated in the configured grant scheme, the transmission occasion and frequency allocation location of the initial transmission and retransmission for one TB may be determined by the DCI, and the resource for the next TB may be repeated at SPS intervals. The DCI for the configured grant scheme may be CRC scrambled with SL-SPS-V-RNTI to indicate the configured grant scheme. In addition, the configured grant (CG) scheme can be divided into type1 CG and type2 CG. In the case of type2 CG it is possible to activate or deactivate a resource configured by the configured grant through the DCI.

Hence, in the case of mode 1, the base station 403 may notify the TX UE 401 of scheduling for sidelink communication with the RX UE 402 by transmitting the DCI on the PDCCH (440).

In the case of broadcast transmission, without sidelink RRC setting (415), the TX UE 401 may broadcast the SCI (1st stage) to the RX UE 402 through the PSCCH (460). Also, the TX UE 401 may broadcast data to the RX UE 402 through the PSSCH (480). In the case of broadcast transmission, SCI transmission (2nd stage SCI) through the PSSCH (470) may be not performed.

Contrary to this, in the case of unicast or groupcast transmission, the TX UE 401 may establish an RRC connection to another UE on a one-to-one basis. Here, the RRC connection between UEs may be referred to as PC5-RRC (415) in distinction from Uu-RRC. In FIG. 4, the PC5-RRC connection (415) is shown as an operation after SL-SIB transmission (410), but it may be performed at any time before SL-SIB transmission (410) or before SCI transmission. If RRC connection between UEs is required, a sidelink PC5-RRC connection may be made and the TX UE 401 may transmit the SCI (1st stage) to the RX UE 402 through the PSCCH by use of unicast or groupcast (460). In this case, groupcast transmission of SCI may be interpreted as a group SCI. Further, the TX UE 401 may transmit the SCI (2nd stage) to the RX UE 402 through the PSSCH by use of unicast or groupcast (470). Here, information related to resource allocation may be included in the 1st stage SCI, and other control information may be included in the 2nd stage SCI. In addition, the TX UE 401 may transmit data to the RX UE 402 through the PSSCH by use of unicast or groupcast (480).

Figure 5:
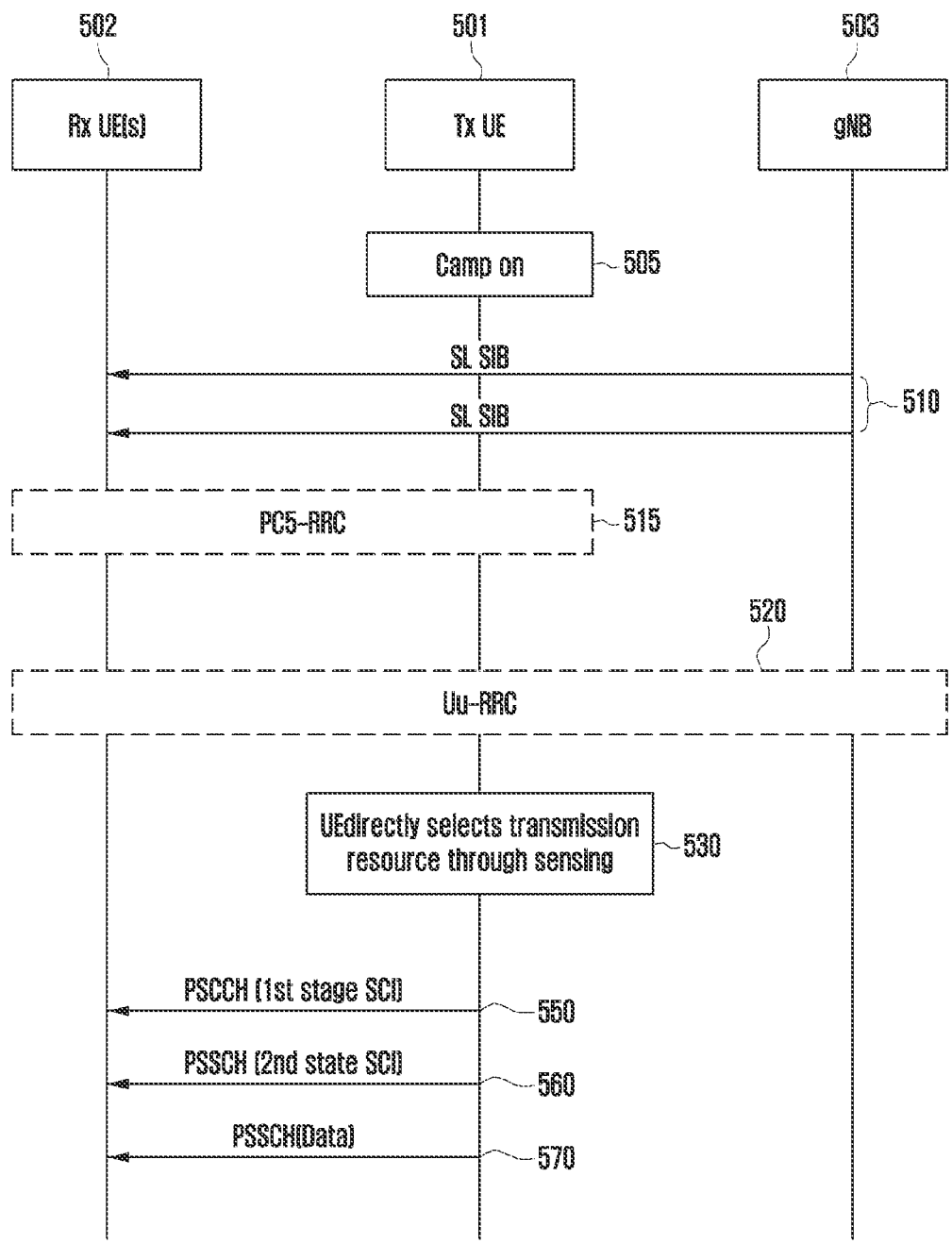
FIG. 5 is a diagram illustrating a method in which a UE directly allocates a sidelink transmission resource through sensing in the sidelink according to an embodiment of the disclosure.

FIG. 5 is a diagram illustrating a method in which a UE directly allocates a sidelink transmission resource through sensing in the sidelink according to an embodiment of the disclosure.

Hereinafter, a method in which the UE directly allocates a sidelink transmission resource through sensing in the sidelink will be referred to as mode 2. Mode 2 may also be referred to as UE autonomous resource selection. In mode 2, the base station 503 may provide a sidelink transmission/reception resource pool for V2X as system information, and the TX UE 501 may select a transmission resource according to a specified rule. Compared to mode 1 in which the base station is directly involved in resource allocation, in FIG. 5, there is a difference in that the TX UE 501 autonomously selects a resource and transmits data based on a resource pool previously received through system information.

With reference to FIG. 5, the TX UE 501 in camping state (505) and the RX UE 502 may receive an SL-SIB from the base station 503 (510). Here, the RX UE 502 indicates a UE that receives data transmitted by the TX UE 501. The SL-SIB information may include sidelink resource pool information for sidelink transmission/reception, parameter setting information for sensing operation, information for setting sidelink synchronization, or carrier information for sidelink transmission and reception operating at different frequencies.

The difference between FIG. 4 and FIG. 5 is that whereas the base station 503 and the UE 501 operate in RRC connected state in FIG. 4, the UE may operate in idle mode (520) (the state in which RRC connection is not established) in FIG. 5. Also, even in RRC connection state (520), without directly participating in resource allocation, the base station 503 may allow the TX UE 501 to autonomously select a transmission resource. Here, the RRC connection between the UE 501 and the base station 503 may be referred to as Uu-RRC (520). When data traffic for V2X is generated in the TX UE 501, the TX UE 501 may be configured with a resource pool through system information received from the base station 503, and the TX UE 501 may directly select a resource in the time and frequency domain through sensing within the configured resource pool (530).

In the case of broadcast transmission, without sidelink RRC setting (520), the TX UE 501 may broadcast the SCI (1st stage) to the RX LT 502 through the PSCCH (550). Also, the TX UE 501 may broadcast data to the RX UE 502 through the PSSCH (560). In the case of broadcast transmission, SCI transmission (2nd stage SCI) through the PSSCH (470) may be not performed.

Contrary to this, in the case of unicast or groupcast transmission, the TX UE 501 may establish an RRC connection to another UE on a one-to-one basis. Here, the RRC connection between UEs may be referred to as PC5-RRC in distinction from Uu-RRC. Also in the case of groupcast, PC5-RRC may be individually established between UEs in the group. In FIG. 5, the PC5-RRC connection (515) is shown as an operation after SL-SIB transmission (510), but it may be performed at any time before SL-SIB transmission (510) or before SCI transmission (550). If RRC connection between UEs is required, a sidelink PC5-RRC connection may be made (515) and the TX UE 501 may transmit the SCI (1st stage) to the RX UE 502 through the PSCCH by use of unicast or groupcast (550). In this case, groupcast transmission of SCI may be interpreted as a group SCI. Further, the TX UE 501 may transmit the SCI (2nd stage) to the RX UE 502 through the PSSCH by use of unicast or groupcast (560). Here, information related to resource allocation may be included in the 1st stage SCI, and other control information may be included in the 2nd stage SCI. In addition, the TX UE 501 may transmit data to the RX UE 502 through the PSSCH by use of unicast or groupcast (570).

Figure 6:
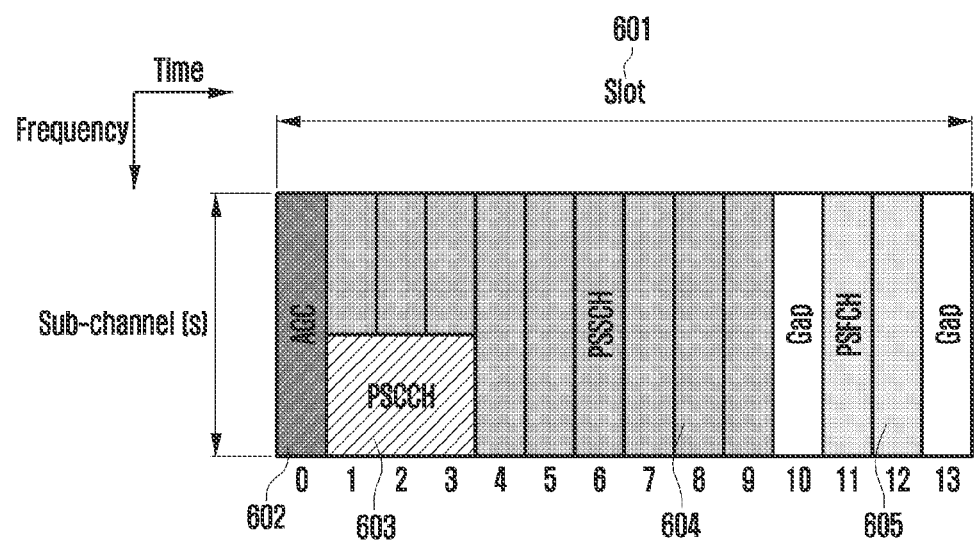
FIG. 6 is a diagram illustrating a mapping structure of physical channels mapped to one slot in the sidelink according to an embodiment of the disclosure.

FIG. 6 is a diagram illustrating a mapping structure of physical channels mapped to one slot in the sidelink according to an embodiment of the disclosure.

Specifically, the mapping for PSCCH/PSSCH/PSFCH physical channels is shown in FIG. 6. PSCCH/PSSCH/PSFCH may be allocated to one or more sub-channels in the frequency domain. For details on sub-channel allocation, refer to the description of FIG. 3. Next, to describe the time domain mapping of PSCCH/PSSCH/PSFCH with reference to FIG. 6, one or more symbols before the TX UE transmits PSCCH/PSSCH/PSFCH in the corresponding slot 601 may be used as a region 602 for automatic gain control (AGC). When the corresponding symbol(s) is used for AGC, it nay be considered to repeatedly transmit a signal of another channel in the corresponding symbol region. In this case, some of PSCCH or PSSCH symbols may be considered as a repeated signal of another channel. Alternatively, a preamble may be transmitted in the AGC region. When a preamble signal is transmitted, there is an advantage that the AGC execution time can be further shortened compared to repeatedly transmitting a signal of another channel. When a preamble signal is transmitted for AGC, a specific sequence may be used as the preamble signal 602, where a sequence such as PSSCH DMRS, PSCCH DMRS, and CSI-RS may be used as a preamble. The sequence used as a preamble in the disclosure is not limited to those described above. Additionally, according to FIG. 6, the PSCCH 603 including control information may be transmitted in the leading symbols of the slot, and data scheduled by the control information of the PSCCH 603 may be transmitted on the PSSCH 604. A portion of sidelink control information (SCI) (1st stage SCI), which is control information, may be mapped to the PSCCH 603 for transmission. Not only data information but also another portion of SCI (2nd stage SCI), which is control information, may be mapped to the PSSCH 604 for transmission. In addition, FIG. 6 shows that a physical sidelink feedback channel (PSFCH) 605, which is a physical channel for transmitting feedback information, is located in the last part of the slot. By securing a specific empty interval (gap) between the PSSCH 604 and the PSFCH 605, the UE that has transmitted or received the PSSCH 604 can prepare to transmit or receive the PSFCH 605. In addition, after transmitting or receiving the PSFCH 605, an empty interval (gap) may be secured for a specific time.

Figure 7:
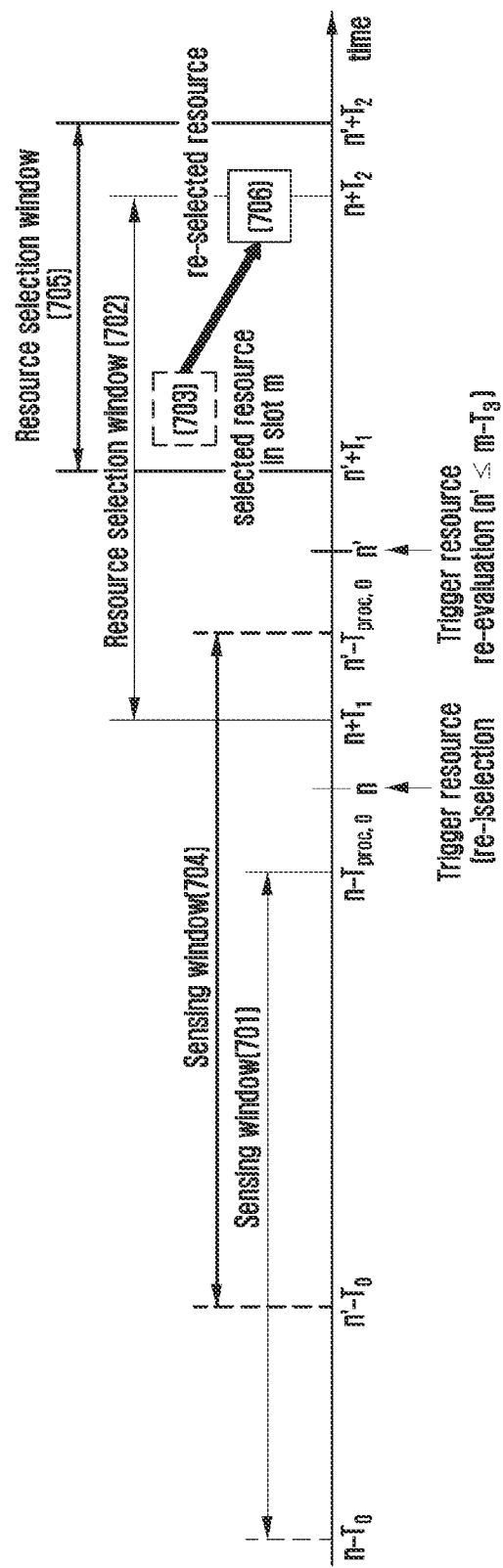
FIG. 7 is a diagram for defining a sensing window and a resource selection window necessary for a UE to perform resource (re)selection and reevaluation for resource allocation in the sidelink according to an embodiment of the disclosure.

FIG. 7 is a diagram for defining a sensing window and a resource selection window necessary for a UE to perform resource (re)selection and reevaluation for resource allocation in the sidelink according to an embodiment of the disclosure.

Specifically, FIG. 7 shows an example in which resource (re-)selection is triggered at time n, sensing is continuously performed even after (re)selection triggering time n, and re-evaluation is triggered at n' (n'>n). When resource (re)selection is triggered first at time n, if the re-evaluation condition is satisfied at time n' (n'>n) after a resource is selected and before the reservation for the selected resource is signaled via the SCI, resource (re)selection may be triggered again.

When resource (re)selection is triggered at time n, a sensing window 701 may be defined as [n−T0, n−Tproc,0). Here, T0 is the start point of the sensing window and may be (pre-)configured as resource pool information. T0 is a positive integer in units of ms, and the disclosure does not limit T0 to a specific value. Also, T'proc,0 may be defined as a time required to process the sensing result. The disclosure does not limit Tproc,0 to a specific value. If Tproc,0 is defined as a positive integer in units of ms or in units of slots, the sensing window 801 may be defined as [n−T0, n−Tproc, 0]. Further, the sensing window can mean a configured interval that has been converted into logical slots belonging to the resource pool before slot n.

Next, when resource (re)selection is triggered at time n, a resource selection window 702 may be determined as [n+T1, n+T2]. Here, T1 is a value in units of slots, and may be selected by UE implementation for T1≤Tproc,1, Tproc,1 may be defined as a maximum reference value in consideration of the processing time required to select a resource. For example, the value of Tproc,1 may be fixed to 4 ms. The disclosure does not limit Tproc,1 to a specific value. Also, T2 is a value in units of slots and may be selected by the UE within a range that satisfies T2min≤T2≤remaining packet delay budget (PDB). Here, T2min is to prevent the UE from selecting T2 having a too small value. Here, 'T2min (priority)' being the T2min value according to the priority may be set at a higher layer. The UE may select a transmission resource within the resource selection window 702.

Next, it is possible to consider the operation of performing re-evaluation by continuously performing sensing even after resource (re)selection is triggered at time n. After a transmission resource is selected through resource (re)selection triggered at time n, if it is determined that the selected resource is not suitable for transmission by continuously performing sensing, triggering at time n' (n'>n) for changing the already selected resource 703 may be defined as re-evaluation. Here, the resource may be reselected (706) by a trigger condition for re-evaluation. The operation of triggering the re-evaluation of the selected resource at time n' (n'>n) after time n when the UE triggers the resource (re)selection may be performed when the UE does not reserve the resource selected by triggering of resource (re)selection. Here, the reservation for a resource may be interpreted as an operation of providing information on the selected resource to other UEs. In FIG. 7, the sensing window 704 and the resource selection window 705 for time n' (n'>n) for triggering the re-evaluation are shown together.

In addition, an operation of resource re-selection for a resource already reserved may be supported in the sidelink. This operation may be called pre-emption. For pre-emption, when the resource reserved by the UE overlaps the resource reserved by another UE, if the priority of the other UE for the reserved resource is higher than the priority of the for the reserved resource, the condition in which pre-emption is performed may be determined according to the result of resource selection based on reference signal received power (RSRP) measurement. When pre-emption is performed, the UE releases the reserved resource and may select a transmission resource again within the resource selection window.

The following embodiments are intended to propose a procedure that enables a UE to perform resource selection in the sidelink in consideration of carrier aggregation. First, in a first embodiment, a method for the UE to select a plurality of carriers for carrier aggregation in the sidelink is proposed. In second and third embodiments, when the UE performs carrier aggregation in the sidelink as described above, a method for the UE to select and allocate resources according to the limited UE capability is proposed. Finally, in a fourth embodiment, the overall UE operation of the disclosure will be described with reference to the drawings. In addition, in the following embodiments, it may be assumed that the UE performs an independent sensing and resource selection procedure for each carrier. In accordance with various embodiments, one or more operations included in the first to fourth embodiments may be performed together or selectively according to the flow.

The first embodiment proposes a method for the UE to select a plurality of carriers for carrier aggregation in the sidelink. As a method for the UE to select a plurality of carriers, indicators such as channel busy ratio (CBR) and priority may be utilized.

First, the CBR measured in slot n may be defined as follows.

It is defined as the ratio of sub-channels in the resource pool in which the SL RSSI (sidelink received signal strength indicator) measured by the UE exceeds a (pre-)configured threshold. Here, CBR measurement may be performed in slots [n-X, n-1]. Here, the slot index is based on the physical slot index.

X is the window value at which CBR is measured, and the value of X may be a fixed value or a configurable value.

The CBR measurement may be not supported depending on the UE capability. If CBR measurement is not possible, a default value for CBR may be (pre-)configured in the UE.

First, the following method is proposed as a method for the UE to select a plurality of carriers.

The UE performs CBR measurement on a carrier, and if the measured CBR value is less than threshold A, the UE may select the corresponding carrier. Otherwise, if the measured CBR value is greater than threshold A, the UE may compare the measured CBR value with threshold B. If the measured CBR value is less than threshold B, the UE may consider the corresponding carrier as a selectable candidate.

Here, threshold A and threshold B may be values set at a higher layer. In addition, threshold A and threshold B may be set differently according to the priority or may be set irrespective of the priority. When priority is applied, for example, it may be a priority corresponding to a sidelink logical channel or may be interpreted as a priority indicated by sidelink control information (SCI).

The UE can select a plurality of carriers by use of the above method. If one or more carriers are considered as selectable candidates and the UE (re)selects the carrier, the terminal may (re)select the carrier in the order of the lowest CBR of the carrier, and how many carriers to select may be up to the UE implementation.

Here, when the carrier means a resource pool, one resource pool with the least CBR may be selected.

Note that the disclosure is not limited to the method presented above as a method for the UE to select a plurality of carriers. For example, an indicator such as channel occupancy ratio (CR) may be additionally considered. Further, as described above, a carrier may mean a specific cell or a specific frequency band, or may be interpreted as a specific frequency range such as BWP (bandwidth part). It is also noted that when a plurality of resource pools are configured, the above method of selecting a carrier may be applied to selecting a resource pool.

The second embodiment proposes a method for the UE to select and allocate resources according to the limited UE capability in case of carrier aggregation in the sidelink. First, in the second embodiment, the following method is proposed.

When the UE performs independent sensing and a resource selection procedure (mode 2) on each carrier, if a specific slot in the resource selection window is determined to be used by another carrier (e.g., corresponding resource being selected and reserved) and carrier aggregation cannot be performed in the corresponding slot due to the limited UE capability, the corresponding slot is excluded from resource selection candidates.

Note that this method can also be applied when re-selection is performed due to re-evaluation or pre-emption triggered after selecting a resource as described above. In the disclosure, the term 'exclude' may also be referred to as 'except'. Note also that it can be expressed by other terms that have the same meaning.

FIG. 8 is a diagram for depicting a method for a UE to select and allocate resources in consideration of the limited UE capability when the UE performs carrier aggregation in the sidelink according to an embodiment of the disclosure.

In FIG. 8, a case in which two carriers named carrier X (801) and carrier Y (802) are selected for the UE to perform carrier aggregation is illustrated. For a detailed operation of selecting plural carriers, refer to the first embodiment. Further, it is assumed that carrier aggregation cannot be performed on two carriers due to the limited UE capability. In addition, in FIG. 8, a case in which resource (re)selection is triggered on carrier X (801) of the UE and the sensing and resource selection procedure (mode 2) is performed is illustrated. Hence, the UE may select a resource within the resource selection window 803 of carrier X (801). Indicia 804 indicates candidate slots that can be selected within the resource selection window 803 of carrier X (801). Additionally, in FIG. 8, indicia 805 indicates a resource selected and reserved by the sensing and resource selection procedure (mode 2) already performed on carrier Y (802). According to the method proposed in the second embodiment, when carrier aggregation cannot be performed due to the limited UE capability in a slot within the resource selection window of a specific carrier, if the slot is selected and reserved (resource reservation) in another carrier (805), the corresponding slot 806 is excluded from the resource selection candidates. In other words, the resource corresponding to indicia 806 is excluded from the candidate resources that can be selected within the resource selection window 803. Through this method, the case in which carrier aggregation is restricted due to the limited UE capability can be resolved. Although FIG. 8 shows an example of carrier aggregation of two carriers, in general, when carrier aggregation is to be performed for X (>1) carriers, if carrier aggregation is possible only for Y (<X) carriers due to the limited UE capability, the above method can be applied.

However, when the above method is applied to carrier aggregation, it is necessary to define an additional UE operation for the case of performing re-selection due to re-evaluation or pre-emption triggered after selecting and reserving a resource in the NR sidelink. This will be described in more detail with reference to FIG. 9.

Figure 9A:
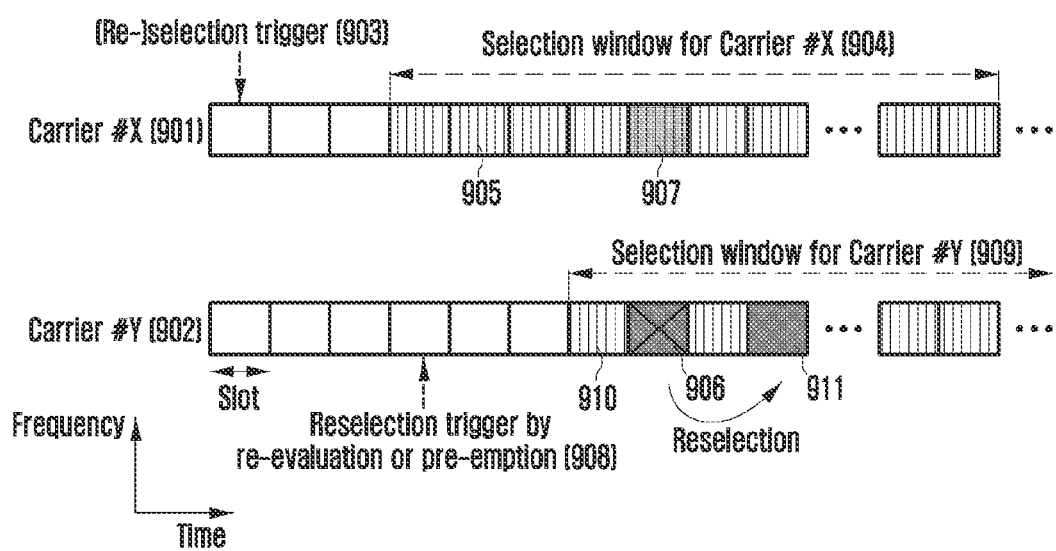
FIG. 9A is a diagram for proposing a UE operation added when carrier aggregation is performed in the sidelink according to an embodiment of the disclosure.

FIG. 9A is a diagram for further proposing a UE operation which prevents re-evaluation or pre-emption from being applied on another carrier for a portion of the time interval to which the method of the second embodiment considering the limited UE capability is applied, when carrier aggregation is performed in the sidelink, according to an embodiment of the disclosure.

In FIG. 9A, a case in which two carriers named carrier X (901) and carrier Y (902) are selected for the UE to perform carrier aggregation is illustrated. For a detailed operation of selecting plural carriers, refer to the first embodiment. Also, it is assumed that carrier aggregation cannot be performed on two carriers due to the limited UE capability. In addition, in FIG. 9A, a case in which resource (re)selection is triggered (903) on carrier X (901) of the UE and the sensing and resource selection procedure (mode 2) is performed is illustrated. Hence, resource (re)selection is triggered (903) on carrier X (901) and the UE may select a resource within the resource selection window 904. Indicia 905 indicates candidate slots that can be selected within the resource selection window 904 of carrier X (901). Additionally, in FIG. 9A, indicia 906 indicates a resource selected and reserved by the sensing and resource selection procedure (mode 2) already performed on carrier Y (902).

According to the method proposed in the second embodiment, when carrier aggregation cannot be performed due to the limited UE capability in a slot within the resource selection window of a specific carrier, if the slot is selected and reserved (resource reservation) in another carrier (906), the corresponding slot 907 is excluded from the resource selection candidates. In other words, the resource corresponding to indicia 907 is excluded from the candidate resources that can be selected within the resource selection window 904. However, after selecting and reserving a resource on carrier Y (902), when resource reselection is performed from among the resource candidates 910 selectable within the resource selection window 909 due to triggering of re-evaluation or pre-emption (908), the existing resource 906 may be deselected and a new resource 911 may be re-selected. However, in this case, as a result, the meaning of the operation of excluding the resource 907 on carrier X (901) is lost. In other words, the candidate resource 907 that can be selected within the resource selection window 904 of carrier X (901) may be excluded unnecessarily.

Accordingly, when the method of the second embodiment considering the limited UE capability is applied in case of performing carrier aggregation in the sidelink, the following UE operation may be defined. The following UE operation may be defined to prevent re-evaluation or pre-emption from being applied on another carrier.

If resource (re)selection is triggered on a specific carrier, re-evaluation or pre-emption is not applied on another carrier at least in the time interval corresponding to the resource selection window.

Here, the meaning that re-evaluation or pre-emption is not applied can be interpreted as meaning that resource re-selection is not made. This can be achieved by an operation of not triggering re-evaluation or pre-emption in the corresponding interval. Alternatively, this can be achieved by an operation of not performing resource re-selection even if re-evaluation or pre-emption is triggered in the corresponding interval.

Figure 9B:
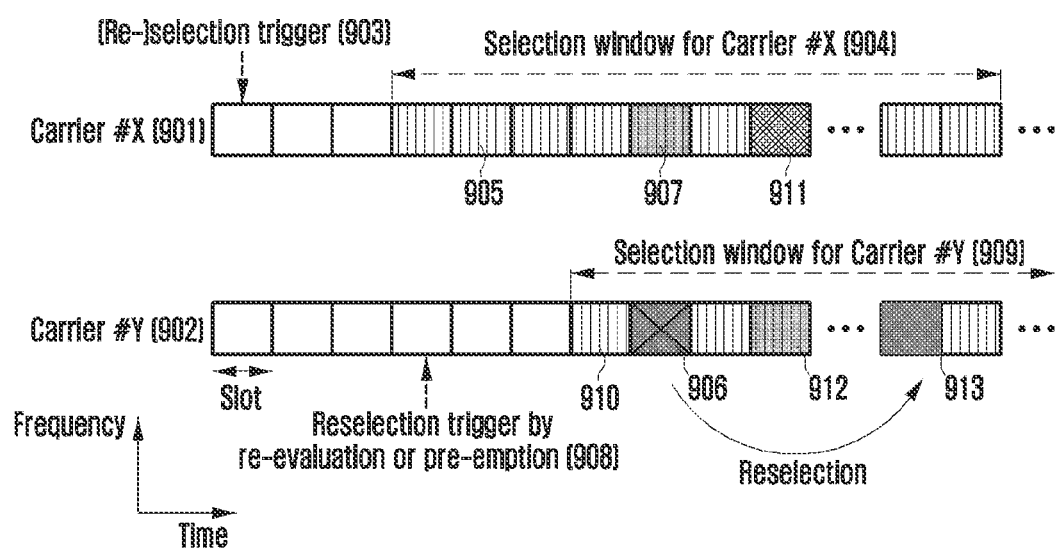
FIG. 9B is a diagram for proposing another UE operation added when carrier aggregation is performed in the sidelink according to an embodiment of the disclosure.

FIG. 9B is a diagram for further proposing a UE operation needed when re-evaluation or pre-emption is applied on another carrier in case that the method of the second embodiment considering the limited UE capability is applied, when carrier aggregation is performed in the sidelink, according to an embodiment of the disclosure.

In FIG. 9B, a case in which two carriers named carrier X (901) and carrier Y (902) are selected for the UE to perform carrier aggregation is illustrated. For a detailed operation of selecting plural carriers, refer to the first embodiment. Also, it is assumed that carrier aggregation cannot be performed on two carriers due to the limited UE capability. In addition, in FIG. 9B, a case in which resource (re)selection is triggered (903) on carrier X (901) of the UE and the sensing and resource selection procedure (mode 2) is performed is illustrated. Hence, resource (re)selection is triggered (903) on carrier X (901) and the UE may select a resource within the resource selection window 904. Indicia 905 indicates candidate slots that can be selected within the resource selection window 904 of carrier X (901). Additionally, in FIG. 9B, indicia 906 indicates a resource selected and reserved by the sensing and resource selection procedure (mode 2) already performed on carrier Y (902).

According to the method proposed in the second embodiment, when carrier aggregation cannot be performed due to the limited UE capability in a slot within the resource selection window of a specific carrier, if the slot is selected and reserved (resource reservation) in another carrier (906), the corresponding slot 907 is excluded from the resource selection candidates. In other words, the resource corresponding to indicia 907 is excluded from the candidate resources that can be selected within the resource selection window 904. However, after selecting and reserving a resource on carrier Y (902), when resource reselection is performed from among the resource candidates 910 selectable within the resource selection window 909 due to triggering of re-evaluation or pre-emption (908), the existing resource 906 may be deselected and a new resource may be re-selected. However, in this case, as a result, the meaning of the operation of excluding the resource 907 on carrier X (901) is lost. In other words, the candidate resource 907 that can be selected within the resource selection window 904 of carrier X (901) may be excluded unnecessarily. Nevertheless, unlike the method of FIG. 9A, to allow triggering of re-evaluation or pre-emption (908) after selecting and reserving a resource on carrier Y (902), it is necessary to consider an additional UE operation for re-evaluation or pre-emption correspondingly.

In FIG. 9B, the case where the resource 911 is finally selected on carrier X (901), and resource reselection is performed on carrier Y (902) due to re-evaluation or pre-emption triggered in the UE is illustrated. For example, when the UE deselects the existing resource 906 on carrier Y (902) and reselects a resource corresponding to the resource 912, transmission is performed in the same slot as the resource 911 selected on carrier X (901). Since the case where carrier aggregation on two carriers cannot be performed due to the limited UE capability cannot be supported, it is necessary to prevent such a case. Specifically, when the UE deselects the existing resource 906 on carrier Y (902) and reselects a resource, if carrier aggregation cannot be performed on two carriers due to the limited UE capability, the resource corresponding to a slot selected on another carrier should be excluded from the reselection resource candidates. In other words, the resource corresponding to 912 is excluded from the candidate resources that can be selected in the resource selection window 909. Hence, in FIG. 9B, an example in which another resource 913 is reselected according to this procedure is illustrated. Therefore, in this case, the following UE operation may be defined.

When resource reselection is triggered by re-evaluation or pre-emption on a specific carrier, if carrier aggregation cannot be performed on plural carriers due to the limited UE capability, the resource corresponding to a slot selected on another carrier is excluded from the candidates for reselection resources.

FIGS. 10A to 10D are diagrams for explaining, in case that the method proposed in the second embodiment is applied to a specific carrier due to the limited UE capability when performing carrier aggregation in the sidelink, considerations regarding the sidelink slot structure, sidelink channel configuration, and performing TX chain switching on another carrier according to various embodiments of the disclosure.

In FIGS. 10A to 10D, a case in which two carriers named carrier X (1001) and carrier Y (1002) are selected for the UE to perform carrier aggregation is illustrated. For a detailed operation of selecting plural carriers, refer to the first embodiment. Also, it is assumed that carrier aggregation cannot be performed on two carriers due to the limited UE capability. In addition, in FIGS. 10A to 10D, a case in which resource (re)selection is triggered (1003) on carrier X (1001) of the UE and the sensing and resource selection procedure (mode 2) is performed is illustrated. Hence, the UE may select a resource within the resource selection window 1004 of carrier X (1001). Indicia 1005 indicates candidate slots that can be selected within the resource selection window 1004 of carrier X (1001).

Figure 10A:
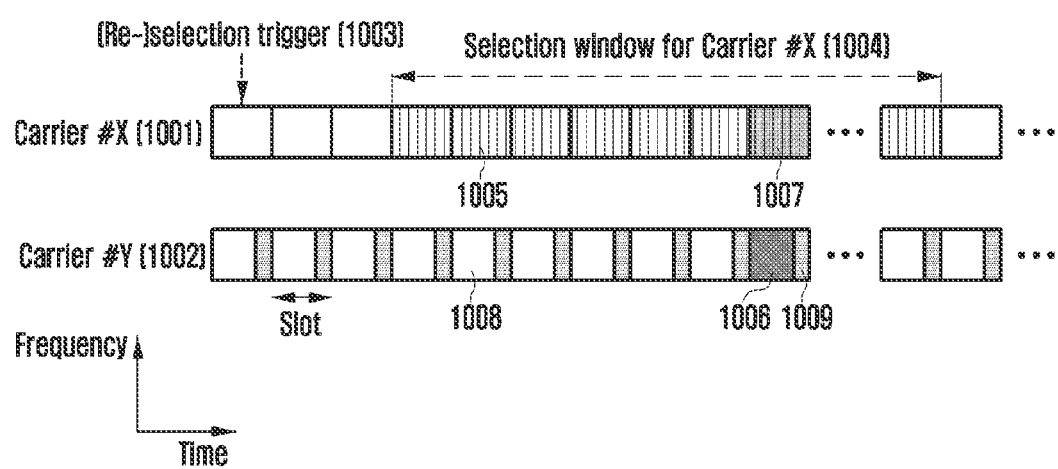
FIG. 10A is a diagram illustrating a case in which the sidelink slot structure is different between carriers when carrier aggregation is performed in the sidelink according to an embodiment of the disclosure.

In FIG. 10A, a case in which the sidelink slot structure of carrier Y (1002) is different from that of carrier X (1001) is illustrated. In this case, carrier X (1001) is configured to utilize all symbols of a slot for sidelink transmission, and carrier Y (1002) is configured to utilize only some symbols 1008 of a slot for sidelink transmission. Note that the case shown in FIG. 10A may occur because the configuration for symbols used as sidelink in a slot may be set for each sidelink bandwidth part (SL BWP). In FIG. 10A, indicia 1006 indicates a resource selected and reserved by the sensing and resource selection procedure (mode 2) already performed on carrier Y (1002).

According to the method proposed in the second embodiment, when carrier aggregation cannot be performed due to the limited UE capability in a slot within the resource selection window of a specific carrier, if the slot is selected and reserved (resource reservation) in another carrier (1006), the corresponding slot 1007 is excluded from the resource selection candidates. In other words, the resource corresponding to indicia 1007 is excluded from the candidate resources that can be selected within the resource selection window 1007. However, as shown in FIG. 10A, in carrier Y (1002), only some symbols 1008 of the slot are used for sidelink transmission and the remaining symbols 1009 may be a symbol region not used for transmission. Hence, it is possible to consider utilization of the region corresponding to indicia 1009 in carrier X (1001) taking account of the TX chain switching time.

Figure 10B:
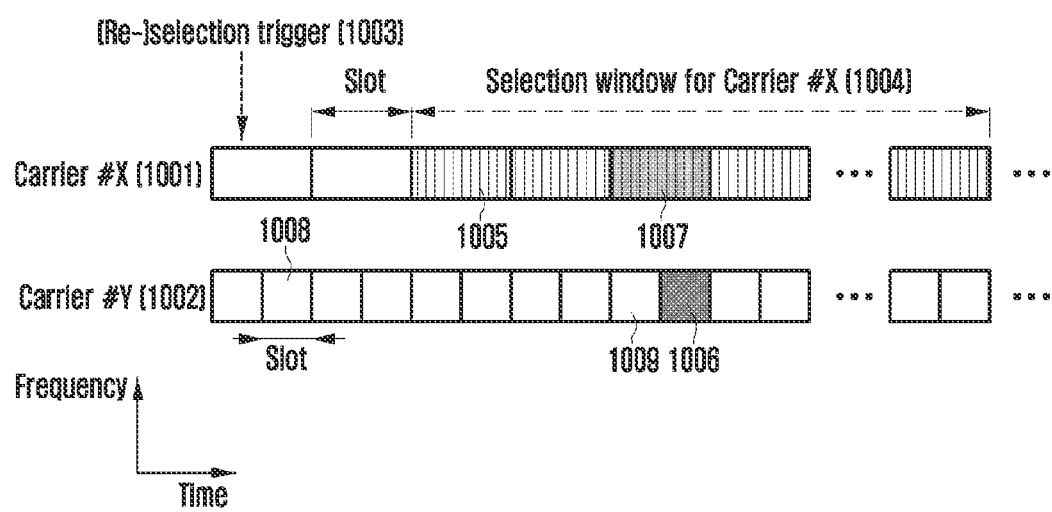
FIG. 10B is a diagram illustrating a case in which the numerology is different between carriers when carrier aggregation is performed in the sidelink according to an embodiment of the disclosure.

In FIG. 10B, a case in which the numerology used for sidelink transmission and reception of carrier Y (1002) is different from that of carrier X (1001) is illustrated. For example, in this case, carrier X (1001) is configured to have a subcarrier spacing (SCS) set to 15 kHz, and carrier Y (1002) is configured to have an SCS set to 30 KHz, so that the length of the slot 1008 in carrier Y (1002) is shorter than that of carrier X (1001). In FIG. 10B, indicia 1006 indicates a resource selected and reserved by the sensing and resource selection procedure (mode 2) already performed on carrier Y (1002), According to the method proposed in the second embodiment, when carrier aggregation cannot be performed due to the limited UE capability in a slot within the resource selection window of a specific carrier, if the slot is selected and reserved (resource reservation) in another carrier (1006), the corresponding slot 1007 is excluded from the resource selection candidates. In other words, the resource corresponding to indicia 1007 is excluded from the candidate resources that can be selected within the resource selection window 1007. However, as shown in FIG. 10B, in carrier Y (1002), slot 1006 may be a resource used for sidelink transmission and slot 1009 may be a resource not used for transmission. Hence, it is possible to consider utilization of the region corresponding to indicia 1009 in carrier X (1001) taking account of the TX chain switching time.

Figure 10C:
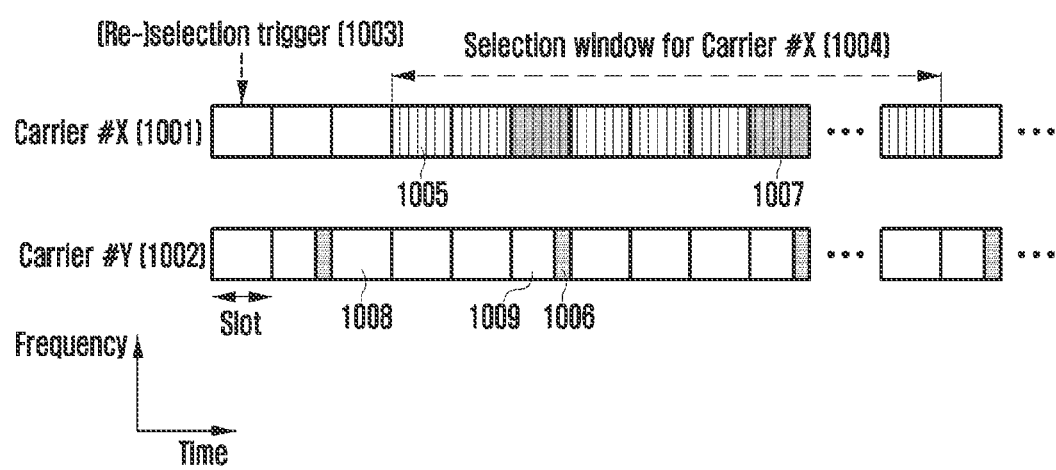
FIG. 10C is a diagram illustrating a case in which a PSFCH is configured in a resource pool of another carrier when carrier aggregation is performed in the sidelink according to an embodiment of the present disclosure.

In FIG. 10C, a case in which the physical sidelink feedback channel (PSFCH) is configured in the resource pool of carrier Y (1002) is illustrated. For example, the PSFCH is not configured in the resource pool of carrier X (1001), and PSFCH 1006 is configured every 4 slots (PSFCH periodicity N=4) in carrier Y (1002).

The periodicity of the PSFCH that can be configured in the resource pool may be varied. For example, the PSFCH may be configured every slot or every 2 slots. There is no restriction on the periodicity of the PSFCH configured in the disclosure. Although, for convenience of description, it is assumed in FIG. 10C that the PSFCH appears with the periodicity thereof and feedback transmission actually occurs on the PSFCH, in reality, appearance of the PSFCH and actual occurrence of feedback transmission or reception on the PSFCH may be determined by various parameters including not only the periodicity (N) of the resource that can carry the PSFCH but also offset value (K) between the slot in which the PSSCH is received and the slot in which the PSFCH is transmitted, time domain slots designated as a resource pool, and whether HARQ feedback is enabled. In carrier Y (1002) of FIG. 10C, indicia 1008 denotes a slot in which a PSFCH region is not configured, and indicia 1006 denotes a region in which PSFCH transmission and reception can occur.

According to the method proposed in the second embodiment, when carrier aggregation cannot be performed due to the limited UE capability in a slot within the resource selection window of a specific carrier, if it is determined that the slot is to be used in another carrier (1006), the corresponding slot 1007 is excluded from the resource selection candidates. In other words, the resource corresponding to indicia 1007 is excluded from the candidate resources that can be selected within the resource selection window 1007. However, as shown in FIG. 10C, in carrier Y (1002), the region 1009 not configured as PSFCH 1006 may be a resource not used for sidelink transmission. Hence, it is possible to consider utilization of the region corresponding to indicia 1009 in carrier X (1001) taking account of the TX chain switching time.

Figure 10D:
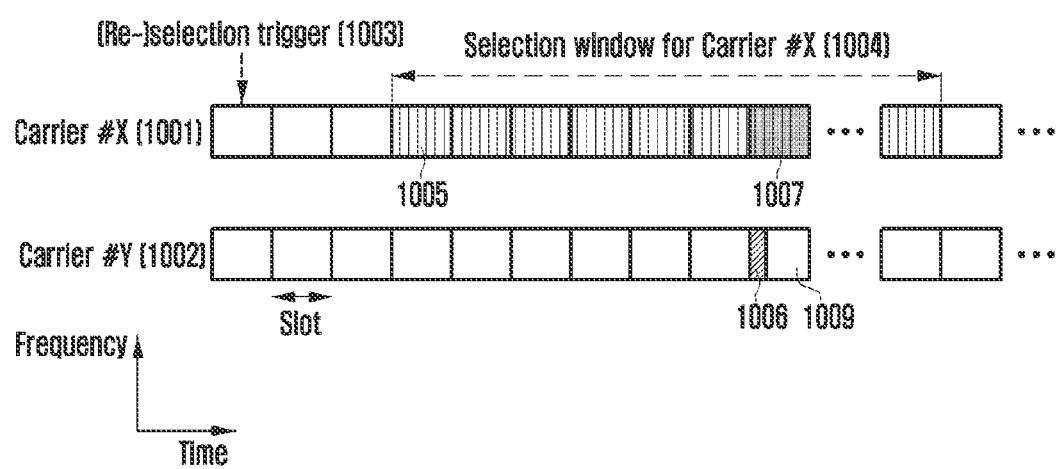
FIG. 10D is a diagram illustrating a case in which TX chain switching is performed in a symbol region of a specific slot of another carrier when carrier aggregation is performed in the sidelink according to an embodiment of the disclosure.

FIG. 10D illustrates a case in which TX chain switching is performed in a symbol region 1006 of a specific slot in carrier Y (1002).

According to the method proposed in the second embodiment, when carrier aggregation cannot be performed due to the limited UE capability in a slot within the resource selection window of a specific carrier, if it is determined that the slot is to be used in another carrier (1006), the corresponding slot 1007 is excluded from the resource selection candidates. In other words, the resource corresponding to indicia 1007 is excluded from the candidate resources that can be selected within the resource selection window 1007. However, as shown in FIG. 10D, in carrier Y (1002), the remaining symbol region 1009 except for the symbol region 1006 in which TX chain switching is performed may be a resource not used for sidelink transmission. Hence, itis possible to consider utilization of the region corresponding to indicia 1009 in carrier X (1001) taking account of the TX chain switching time. Here, the TX chain switching time may vary depending on the frequency range (low or high frequency range) in which TX chain switching occurs and the numerology. Also, the required TX chain switching time may vary depending on whether it is intra-band TX chain switching or inter-band TX chain switching.

According to the method proposed in the second embodiment, when carrier aggregation cannot be performed due to the limited UE capability in a slot within the resource selection window of a specific carrier, if it is determined that the slot is to be used in another carrier, the corresponding slot may be excluded from the resource selection candidates. However, as indicated by indicia 1009 in FIGS. 10A to 10D, examples in which the use of some of the resources without resource exclusion in carrier X (1001) may be considered have been presented. The disclosure is not limited to those examples presented above.

Next, a description will be given of possible UE operations proposed for the case in which the method proposed in the second embodiment is applied to a specific carrier due to the limited UE capability when performing carrier aggregation in the sidelink, in consideration of the sidelink slot structure, sidelink channel configuration, and performing TX chain switching on another carrier.

Method 1: in case that the UE performs an independent sensing and resource selection procedure (mode 2) on each carrier, when carrier aggregation cannot be performed due to the limited UE capability in a slot within the resource selection window, if it is determined that a portion of the slot is to be used in another carrier (e.g., corresponding resource being selected and reserved), the corresponding slot is excluded from the resource selection candidates.

Method 2: in case that the UE performs an independent sensing and resource selection procedure (mode 2) on each carrier, when carrier aggregation cannot be performed due to the UE capability in a slot within the resource selection window, if it is determined that a portion of the slot is to be used in another carrier (e.g., corresponding resource being selected and reserved), only a region of the corresponding slot may be excluded from the resource selection candidates.

In method 2, when only a part of the corresponding slot is excluded from the resource selection candidates, and the remaining part of the slot is included in the resource selection candidates and finally selected, the UE may notify information about the symbols used for the sidelink in the slot to other UEs through control signal information (SCI) when the selected resource is transmitted. This is to enable an RX UE to receive the resource through the corresponding information because the length of symbols used for sidelink transmission for a resource selected in a specific slot is different from that of another slot. Here, the corresponding information may be included in the 2nd stage SCI transmitted on the PSSCH. The information on the symbols used for the sidelink transmitted through the SCI may be alternative information that can be indirectly interpreted. For example, information on a symbol region not used for transmission in the corresponding slot may be indicated.

When method 2 is applied, TX chain switching may occur between carriers because a part of the slot is transmitted on one carrier and the remaining part of the slot is transmitted on another carrier. Hence, a region of the slot may be considered as a TX chain switching time. Here, the TX chain switching time may vary depending on the frequency range (low or high frequency range) in which TX chain switching occurs and the numerology. Also, the required TX chain switching time may vary depending on whether it is intra-band TX chain switching or inter-band TX chain switching.

When method 2 is applied, since the length of symbols used for sidelink transmission for a resource selected in a specific slot may be different from that of another slot, the measurement period for reference signal received power (RSRP) may be varied. This may correspond to the case where PSSCH-RSRP is used. Specifically, the RSRP measurement result can be used to select a selectable resource within the resource selection window when performing the sensing and resource selection procedure (mode 2), and PSSCH-RSRP or PSCCH-RSRP may be selected through the resource pool configuration. If PSSCH-RSRP is configured, since the symbol length of the PSSCH may vary when method 2 is applied, a case may occur that the measurement period varies depending on the slot, which may be a disadvantage in implementation. To avoid this implementation disadvantage, when method 2 is applied, it may consider to place a restriction through resource pool configuration so that only PSCCH-RSRP is used.

Method 3: in case that the UE performs an independent sensing and resource selection procedure (mode 2) on each carrier, when carrier aggregation cannot be performed due to the limited UE capability in a slot within the resource selection window, if it is determined that a portion of the slot is to be used in another carrier (e.g., corresponding resource being selected and reserved), whether to exclude the corresponding slot from the resource selection candidates may be determined according to the resource used in another carrier.

In method 3, 'whether to exclude' may be determined according to the type of sidelink channels used in different carriers or the priority of resources. For example, it is possible to consider the following two alternatives.

As a first alternative, in case of being determined based on the type of a sidelink channel, if it is determined in method 3 that the PSFCH will be used simultaneously in the same slot on another carrier due to prioritization of the PSSCH over the PSFCH, dropping the PSFCH used in the other carrier may be considered without excluding the corresponding slot from the resource selection candidates.

As a second alternative, when it is determined that a resource will be simultaneously used in the same slot on different carriers, whether to exclude the resource may be determined according to the priority of the PSSCH associated with the corresponding resource. If the priority of the resource on the other carrier is higher, the resource of the corresponding slot on the corresponding carrier may be excluded from the resource selection candidates. However, on the contrary, if the priority of the resource on the other carrier is lower, the resource on the other carrier may be dropped without excluding the resource in the corresponding slot on the corresponding carrier from the resource selection candidates.

In method 3, when the resource of a specific carrier is dropped, the UE may notify information about it (being dropped or not) to other UEs through SCI (control signal information).

Figure 11:
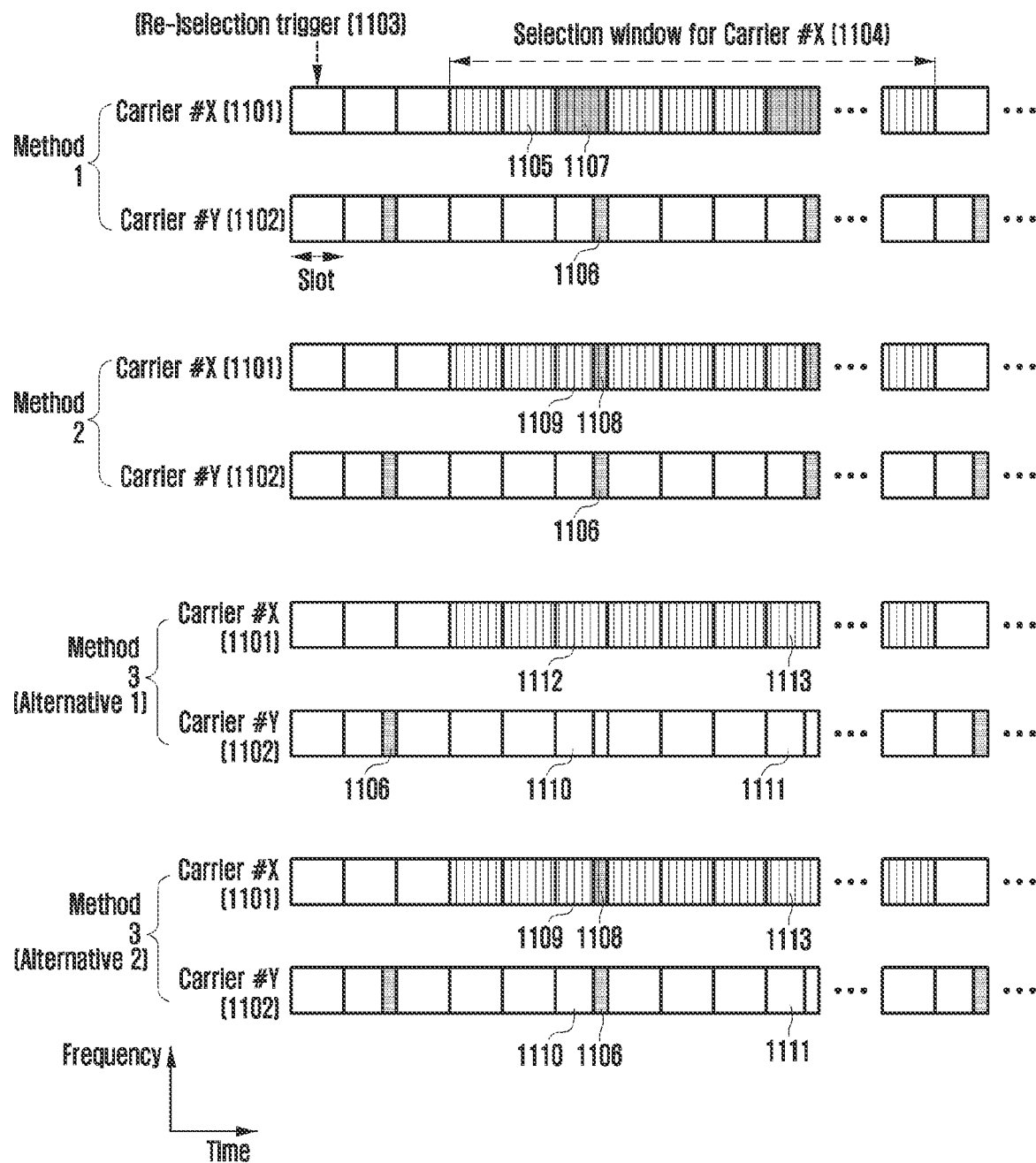
FIG. 11 is a diagram for proposing possible UE operations in consideration of the sidelink slot structure, sidelink channel configuration, and TX chain switching in another carrier in case that a proposed method is applied to a specific carrier due to the limited UE capability when carrier aggregation is performed in the sidelink according to various embodiments of the disclosure.

FIG. 11 is a diagram for depicting application of the above three methods according to various embodiments of the disclosure.

In FIG. 11, among various examples presented in FIGS. 10A to 10D, a case in which a different sidelink channel is configured in the other carrier as in FIG. 10C will be described. However, it is noted that one of the three methods can be applied to different cases including the other examples shown in FIGS. 10A to 10D.

In FIG. 11, a case in which the physical sidelink feedback channel (PSFCH) is configured in the resource pool of carrier Y (1002) is illustrated. Specifically, in FIG. 11, the PSFCH is configured every 4 slots in the resource pool of carrier Y (1002). The periodicity of the PSFCH that can be configured in the resource pool may be varied. For example, the PSFCH may be configured every slot or every 2 slots. There is no restriction on the periodicity of the PSFCH configured in the disclosure. Although, for convenience of description, it is assumed in FIG. 11 that the PSFCH appears with the periodicity thereof and feedback transmission actually occurs on the PSFCH, in reality, appearance of the PSFCH and actual occurrence of feedback transmission or reception on the PSFCH may be determined by various parameters including not only the periodicity (N) of the resource that can carry the PSFCH but also offset value (K) between the slot in which the PSSCH is received and the slot in which the PSFCH is transmitted, time domain slots designated as a resource pool, and whether HARQ feedback is enabled.

Referring to method 1 of FIG. 11, it is similar to the method described with reference to FIG. 10C. A case in which a physical sidelink feedback channel (PSFCH) is configured in the resource pool of carrier Y (1102) is illustrated. For example, the PSFCH is not configured in the resource pool of carrier X (1101), and PSFCH 1106 is configured every 4 slots (PSFCH periodicity N=4) in carrier Y (1102). In carrier Y (1102), indicia 1106 indicates a region in which PSFCH transmission and reception may occur. According to method 1, when carrier aggregation cannot be performed due to the limited UE capability in a slot within the resource selection window of a specific carrier, if it is determined that a part 1106 of the slot is to be used in another carrier, the corresponding slot 1007 is excluded from the resource selection candidates. In other words, the resource corresponding to indicia 1107 is excluded from the candidate resources that can be selected within the resource selection window 1107, Method 1 is a method of excluding the entire slot as indicated by indicia 1107 although it is determined that only a part of the slot is used as indicated by indicia 1106.

Referring to method 2 of FIG. 11, a case in which a physical sidelink feedback channel (PSFCH) is configured in the resource pool of carrier Y (1102) is illustrated. For example, the PSFCH is not configured in the resource pool of carrier X (1101), and PSFCH 1106 is configured every 4 slots (PSFCH periodicity N=4) in carrier Y (1102). In carrier Y (1102), indicia 1106 indicates a region in which PSFCH transmission and reception may occur. In method 2 of FIG. 11, unlike method 1, when carrier aggregation cannot be performed due to the limited UE capability in a slot within the resource selection window of a specific carrier, if it is determined that a part 1106 of the slot is to be used in another carrier, only a region 1108 of the corresponding slot is excluded from the resource selection candidates. In other words, the resource region corresponding to indicia 1108 is excluded from the candidate resources that can be selected within the resource selection window 1107. However, the region corresponding to indicia 1109 is not excluded. If the resource region corresponding to indicia 1109 is finally selected on carrier X (1101), as the resource 1109 on carrier X (1101) is transmitted and the resource 1106 on carrier Y (1102) is transmitted (or received), a TX chain switching time may be required. Since a gap symbol is present in front of the PSFCH channel as shown in FIG. 6, if this region sufficiently covers the required TX chain switching time, an additional gap symbol may be not needed. However, as described above, the TX chain switching time may vary depending on the frequency range (low or high frequency range) in which TX chain switching occurs, and the numerology. In addition, the required TX chain switching time may vary depending on whether it is intra-band TX chain switching or inter-band TX chain switching. Hence, an additional gap symbol may be required.

Referring to method 3 (alternative 1) of FIG. 11, a case in which a physical sidelink feedback channel (PSFCH) is configured in the resource pool of carrier Y (1102) is illustrated. For example, the PSFCH is not configured in the resource pool of carrier X (1101), and PSFCH 1106 is configured every 4 slots (PSFCH periodicity N=4) in carrier Y (1102). In carrier Y (1102), indicia 1106 indicates a region in which PSFCH transmission and reception may occur. In method 3 (alternative 1) of FIG. 11, when carrier aggregation cannot be performed due to the limited UE capability, if it is determined that a part of the corresponding slot is to be used in another carrier, whether to exclude the corresponding slot from the resource selection candidates is determined by the type of the sidelink channel. Referring to method 3 (alternative 1) of FIG. 11, if it is determined that the PSFCH will be used simultaneously in the same slot in another carrier due to prioritization of the PSSCH over the PSFCH, the PSFCH used in the other carrier is dropped without excluding the corresponding slot from the resource selection candidates. In carrier Y (1102), indicia 1110 and 1111 indicate slots in which the PSFCH is dropped. Additionally, in carrier X (1101), indicia 1112 and 1113 indicate that the corresponding slot is not excluded from the resource selection candidates.

Referring to method 3 (alternative 2) of FIG. 11, a case in which a physical sidelink feedback channel (PSFCH) is configured in the resource pool of carrier Y (1102) is illustrated. For example, the PSFCH is not configured in the resource pool of carrier X (1101), and PSFCH 1106 is configured every 4 slots (PSFCH periodicity N=4) in carrier Y (1102). In carrier Y (1102), indicia 1106 indicates a region in which PSFCH transmission and reception may occur. In method 3 (alternative 2) of FIG. 11, when carrier aggregation cannot be performed due to the limited UE capability, if it is determined that a part of the corresponding slot is to be used in another carrier, whether to exclude the corresponding slot from the resource selection candidates is determined by the priority of the PSSCH associated with the corresponding resource. Referring to method 3 (alternative 2) of FIG. 11, in the slot corresponding to indicia 1110 in carrier Y (1102), the priority of the PSSCH associated with the PFSCH 1106 is higher than the priority of the PSSCH to be transmitted at indicia 1109, so that the PSFCH 1006 is not dropped and only a region 1108 of the corresponding slot in carrier X (1101) is excluded from the resource selection candidates. On the other hand, in the slot corresponding to indicia 1111 in carrier Y (1102), the priority of the PSSCH associated with the PFSCH is lower than the priority of the PSSCH to be transmitted at indicia 1113, so that the PSFCH in a region 1111 of carrier Y (1102) is dropped and the corresponding slot 1113 in carrier X (1101) is not excluded from the resource selection candidates.

The third embodiment proposes a resource selection and allocation method considering the limited UE capability when carrier aggregation is performed in the sidelink. Note that the method of this embodiment is different from the method of the second embodiment. The third embodiment proposes the following method.

After the UE selects a resource from selectable resource candidates by performing independent sensing and resource selection procedure (Mode 2) on each carrier, when a resource is selected in the same slot as the selected resource in another carrier and carrier aggregation cannot be performed in the corresponding slot due to the limited UE capability, the position of the slot is changed through resource reselection. In other words, it is a method of canceling resource transmission in the corresponding slot on the corresponding carrier and performing resource reselection for this.

Here, resource reselection may be determined by priority. Specifically, the resource corresponding to a lower priority is for re-selection. When priority is applied, for example, priority may be a priority corresponding to a sidelink logical channel, or may be interpreted as a priority indicated by sidelink control information (SCI).

In the case of changing the position of the slot through resource reselection, when carrier aggregation cannot be performed on plural carriers due to the limited UE capability in a carrier where resource reselection is triggered, if there is a resource already selected on another carrier, the resource corresponding to the same slot in the corresponding carrier may be excluded from the reselection resource candidates.

FIG. 12 is a diagram for depicting a method for a UE to select and allocate resources in consideration of the limited UE capability when carrier aggregation is performed in the sidelink according to various embodiments of the disclosure.

Figure 12A:
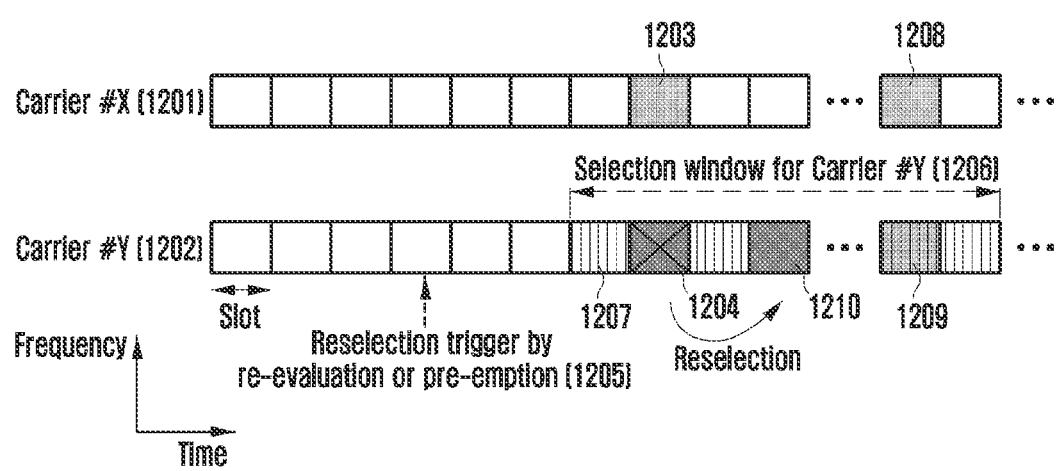
FIG. 12A is a diagram for depicting a method for a UE to select and allocate resources in consideration of the limited UE capability when carrier aggregation is performed in the sidelink according to an embodiment of the disclosure.

With reference to FIG. 12A, a case in which two carriers named carrier X (1201) and carrier Y (1202) are selected for the UE to perform carrier aggregation is illustrated. For a detailed operation of selecting plural carriers, refer to the first embodiment. Also, it is assumed that carrier aggregation cannot be performed on two carriers due to the limited UE capability. Further, in FIG. 12, the UE selects a resource by performing an independent sensing and resource selection procedure (mode 2) on each carrier. Hence, when a resource 1203 is selected on carrier X (1201) and a resource 1204 is selected also on carrier Y (1202) in the same slot as the resource 1203 selected on carrier X (1201), the position of the slot is changed through resource reselection. In this case, it is assumed that the priority of the resource 1204 is lower than that of the resource 1203. Accordingly, in FIG. 12A, a case in which resource reselection is triggered (1205) on carrier Y (1202) and the sensing and resource reselection procedure is performed is illustrated. Hence, the UE may select a resource within the resource selection window 1206 of carrier Y (1202). Indicia 1207 indicates candidate slots that can be selected within the resource selection window 1206 of carrier Y (1202). Here, when carrier aggregation cannot be performed on plural carriers due to the limited UE capability in the carrier where resource reselection is triggered (1205), if there is a resource 1208 already selected on another carrier, the resource 1209 corresponding to the same slot in the corresponding carrier may be excluded from the reselection resource candidates.

Figure 12B:
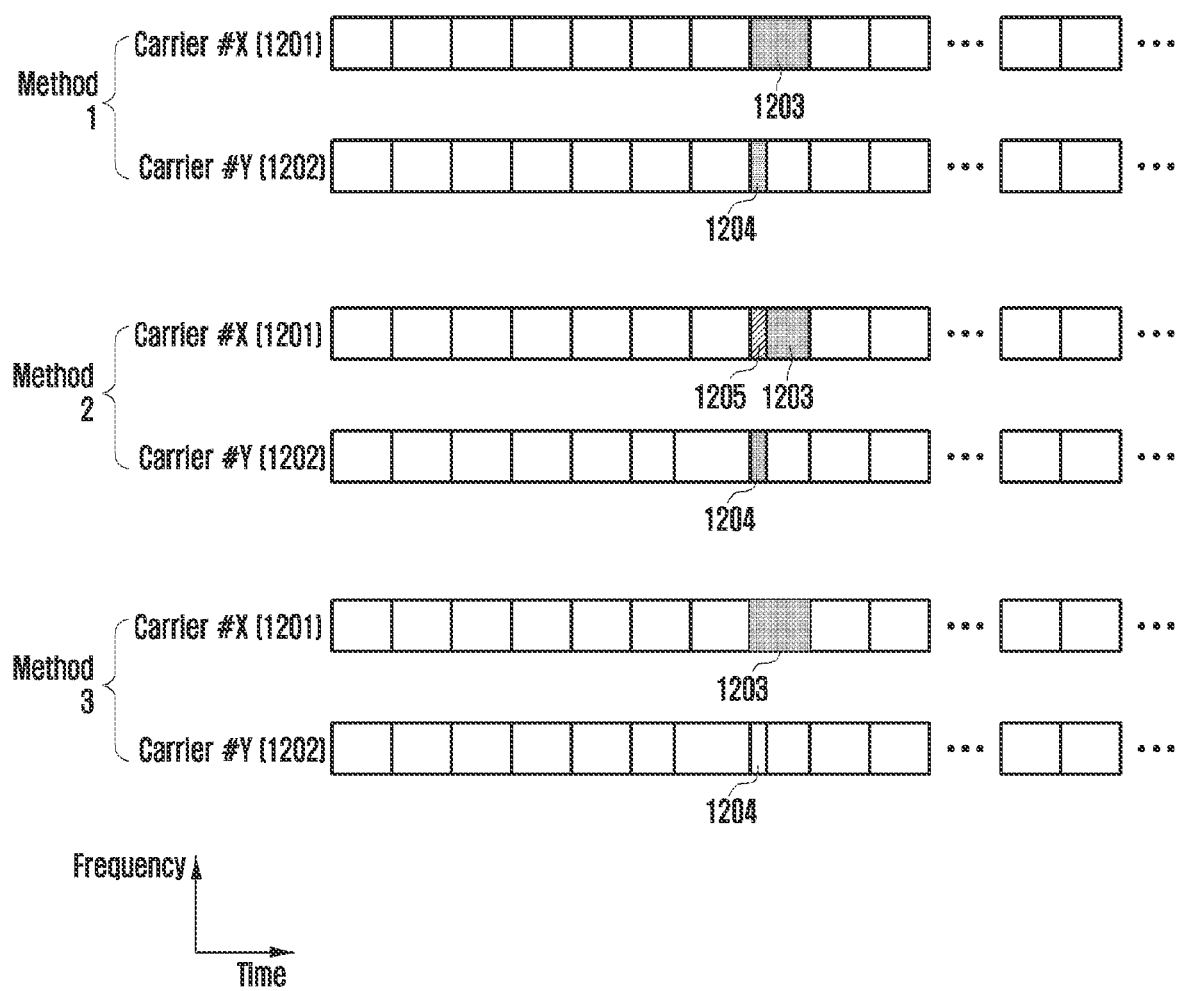
FIG. 12B is a diagram for depicting an additional method for a UE to select and allocate resources in consideration of the limited UE capability when carrier aggregation is performed in the sidelink according to an embodiment of the disclosure.

In FIG. 12B, a UE operation is illustrated that can be additionally considered when the resource selection and allocation method taking account of the limited UE capability is applied in the case of performing carrier aggregation in the sidelink according to the third embodiment of the disclosure. In FIG. 12B, unlike FIG. 12A, carrier X (1201) is configured to utilize all symbols of the slot for sidelink transmission, and it is determined that only a symbol region 1204 of a slot on carrier Y (1202) will be used in the same slot as the resource 1203 selected on carrier X (1201) (e.g., see various examples in FIGS. IDA to 10D). More generally, after the UE selects a resource from selectable resource candidates by performing independent sensing and resource selection procedure (mode on each carrier, when a resource is also selected in another carrier in the same slot as the selected resource, if only some regions of the slot overlap and carrier aggregation cannot be performed in the corresponding slot due to the limited UE capability, the location of the slot can be changed through resource reselection. Her resource reselection may be determined by priority. Additional UE operations possible in this case are proposed as follows.

Method 1: if only regions of the slot overlap, resource reselection is performed on the corresponding carrier for which reselection is determined.

Method 2: if only regions of the slot overlap, a resource can be transmitted only in the remaining region of the slot except for the overlapping resource region on a specific carrier.

When transmitting a resource only in the remaining region of the corresponding slot in method 2, information on symbols used for the sidelink in the slot may be notified to other UEs through control signal information (SCI). This is to enable an RX UE to receive the resource through the corresponding information because the length of symbols used for sidelink transmission for a resource selected in a specific slot is different from that of another slot. Here, the corresponding information may be included in the 2nd stage SCI transmitted on the PSSCH. The information on the symbols used for the sidelink transmitted through the SCI may be alternative information that can be indirectly interpreted. For example, information on a symbol region not used for transmission in the corresponding slot may be indicated.

When method 2 is applied, TX chain switching may occur between carriers because a region of the slot is transmitted on one carrier and the remaining region of the slot is transmitted on another carrier. Hence, a region of the slot may be considered as a TX chain switching time. Here, the TX chain switching time may vary depending on the frequency range (low or high frequency range) in which TX chain switching occurs, and the numerology. Also, the required TX chain switching time may vary depending on whether it is intra-band TX chain switching or inter-band TX chain switching.

When method 2 is applied, since the length of symbols used for sidelink transmission for a resource selected in a specific slot may be different from that of another slot, the measurement period for reference signal received power (RSRP) may be varied. This may correspond to the case where PSSCH-RSRP is used. Specifically, the RSRP measurement result can be used to select a selectable resource within the resource selection window when performing the sensing and resource selection procedure (mode 2), and PSSCH-RSRP or PSCCH-RSRP may be selected through the resource pool configuration. If PSSCH-RSRP is configured, since the symbol length of the PSSCH may vary when method 2 is applied, a case may occur that the measurement period varies depending on the slot, which may be a disadvantage in implementation. To avoid this implementation disadvantage, when method 2 is applied, it may consider to place a restriction through resource pool configuration so that only PSCCH-RSRP is used.

Method 3: if only regions of the slot overlap, depending on the condition of a resource used in the carrier, the resource of a specific carrier may be dropped and resource reselection may be not performed.

In method 3, the 'condition of a resource' may be determined according to the type of sidelink channels used in different carriers or the priority of the resource. For example, two alternatives can be considered as follows.

As a first alternative, in case of being determined based on the type of a sidelink channel, if it is determined in method 3 that the PSFCH will be used simultaneously in the same slot on another carrier due to prioritization of the PSSCH over the PSFCH, the PSFCH used in the other carrier may be dropped.

As a second alternative, when it is determined that a resource will be simultaneously used in the same slot on different carriers, whether to drop the resource may be determined according to the priority of the PSSCH associated with the corresponding resource. Specifically, a resource having a low priority for the resource of the carrier may be dropped.

In method 3, when the resource of a specific carrier is dropped, the UE may notify information about it (being dropped or not) to other UEs through control signal information (SCI).

With reference to FIG. 12B, a case in which two carriers named carrier X (1201) and carrier Y (1202) are selected for the UE to perform carrier aggregation is illustrated. For a detailed operation of selecting plural carriers, refer to the first embodiment. Also, it is assumed that carrier aggregation cannot be performed on two carriers due to the limited UE capability. In FIG. 12B, carrier X (1201) is configured to utilize all symbols of the slot for sidelink transmission, and it is determined that only a symbol region 1204 of a slot on carrier Y (1202) will be used in the same slot as the resource 1203 selected on carrier X (1201) (e.g., see various examples in FIG. 10).

First, referring to method 1 of FIG. 12B, if it is determined that only a symbol region 1204 of a slot on carrier Y (1202) will be used in the same slot as the resource 1203 selected on carrier X (1201), resource reselection is performed on the carrier for which reselection has been determined. Referring to method 2 of FIG. 12B, if it is determined that only a symbol region 1204 of a slot on carrier Y (1202) will be used in the same slot as the resource 1203 selected on carrier X (1201), a resource may be transmitted only in the remaining region 1203 of the slot in carrier X (1201) except for the overlapping resource region. In this case, refer to the above description for an additional UE operation. Referring to method 3 of FIG. 12B, if it is determined that only a symbol region 1204 of a slot on carrier Y (1202) will be used in the same slot as the resource 1203 selected on carrier X (1201), depending on the condition of a resource used in the carrier, the resource of a specific carrier may be dropped and resource reselection may be not performed. For example, since the priority of the resource 1204 in carrier Y (1202) is lower than the priority of the resource 1203 in carrier X (1201), the resource 1204 may be dropped and resource reselection may be not performed. In this case, refer to the above description for an additional UE operation.

The overall UE operation according to the fourth embodiment of the disclosure will be described with reference to FIGS. 13A and 13B.

Figure 13A:
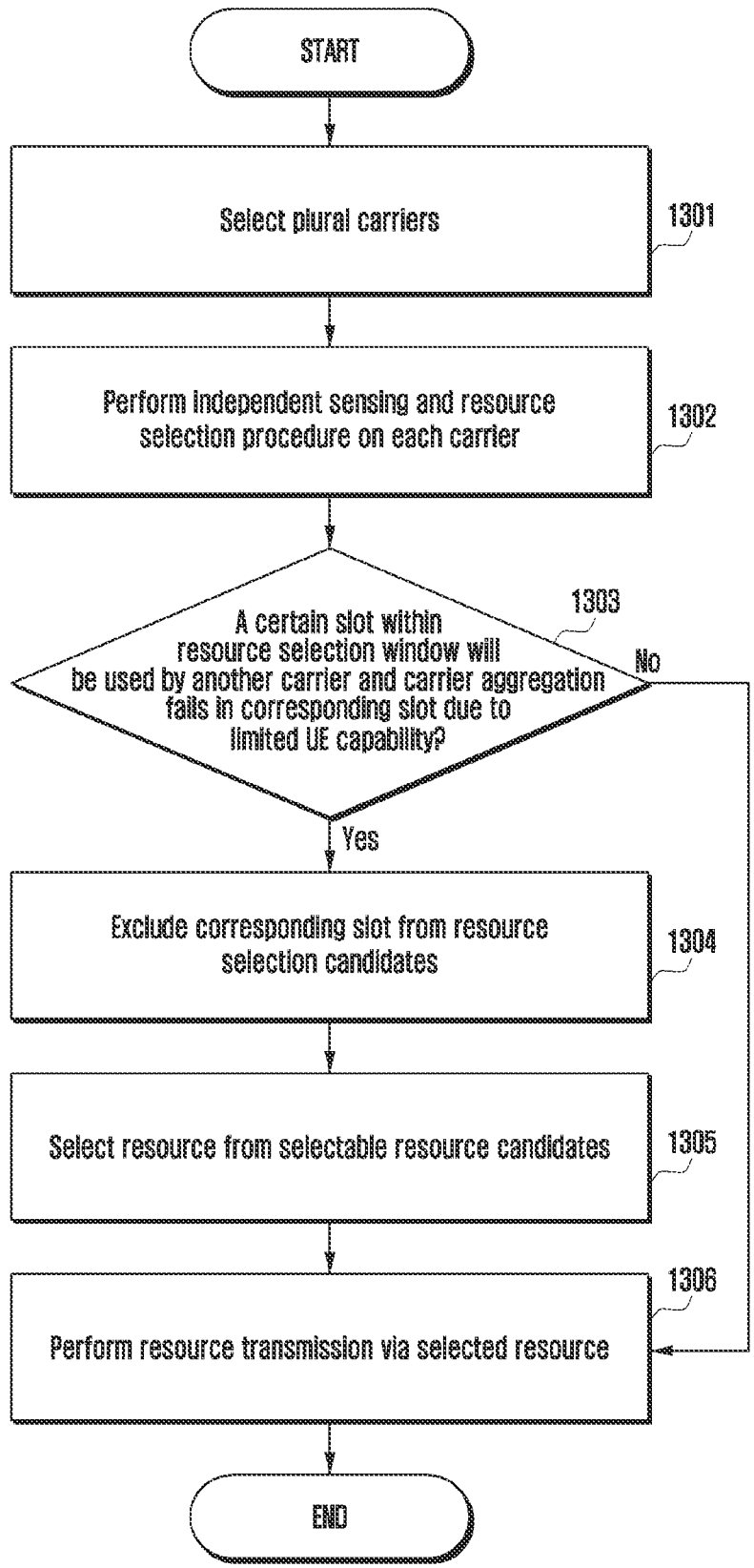
FIG. 13A is a flowchart for a method for a UE to select and allocate resources in consideration of the limited UE capability when carrier aggregation is performed in the sidelink according to an embodiment of the disclosure.

FIG. 13A is a flowchart for a method for a UE to select and allocate resources in consideration of the limited UE capability when carrier aggregation is performed in the sidelink according to the above method proposed in the second embodiment.

First, at step 1301, the UE selects a plurality of carriers to perform carrier aggregation. For a detailed operation of selecting a plurality of carriers, refer to the first embodiment. Next, at step 1302, the UE may perform an independent sensing and resource selection procedure (mode 2) on each carrier. Next, at step 1303, upon determining that a certain slot in the resource selection window will be used by another carrier in the resource selection procedure according to the method proposed in the second embodiment (e.g., the corresponding resource being selected and reserved), the UE determines whether carrier aggregation is possible in the corresponding slot in consideration of the limited UE capability. Upon determining that carrier aggregation is possible, the UE proceeds to step 1306 and performs resource transmission over the selected resource.

On the other hand, upon determining at step 1303 that carrier aggregation is not possible, the UE proceeds to step 1304 and excludes the corresponding slot from the resource selection candidates. Then, at step 1305, the UE selects a resource from the selectable resource candidates. Finally, at step 1306, the UE performs resource transmission over the selected resource. Referring to the second embodiment, for performing the procedure of excluding a resource from the selection candidates at step 1304, considerations such as sidelink slot structure and sidelink channel configuration in another carrier, and performing TX chain switching have been described with reference to FIGS. 10A to 10D, and additional UE operations possible in this case have been presented through methods 1/2/3 and related examples have been described with reference to FIG. 11. Note that the procedure of excluding a resource from the selection candidates at step 1304 may be not performed according to methods 1/2/3. Further, it is noted that when methods 1/2/3 are considered, the utilization efficiency of resources can be improved.

Figure 13B:
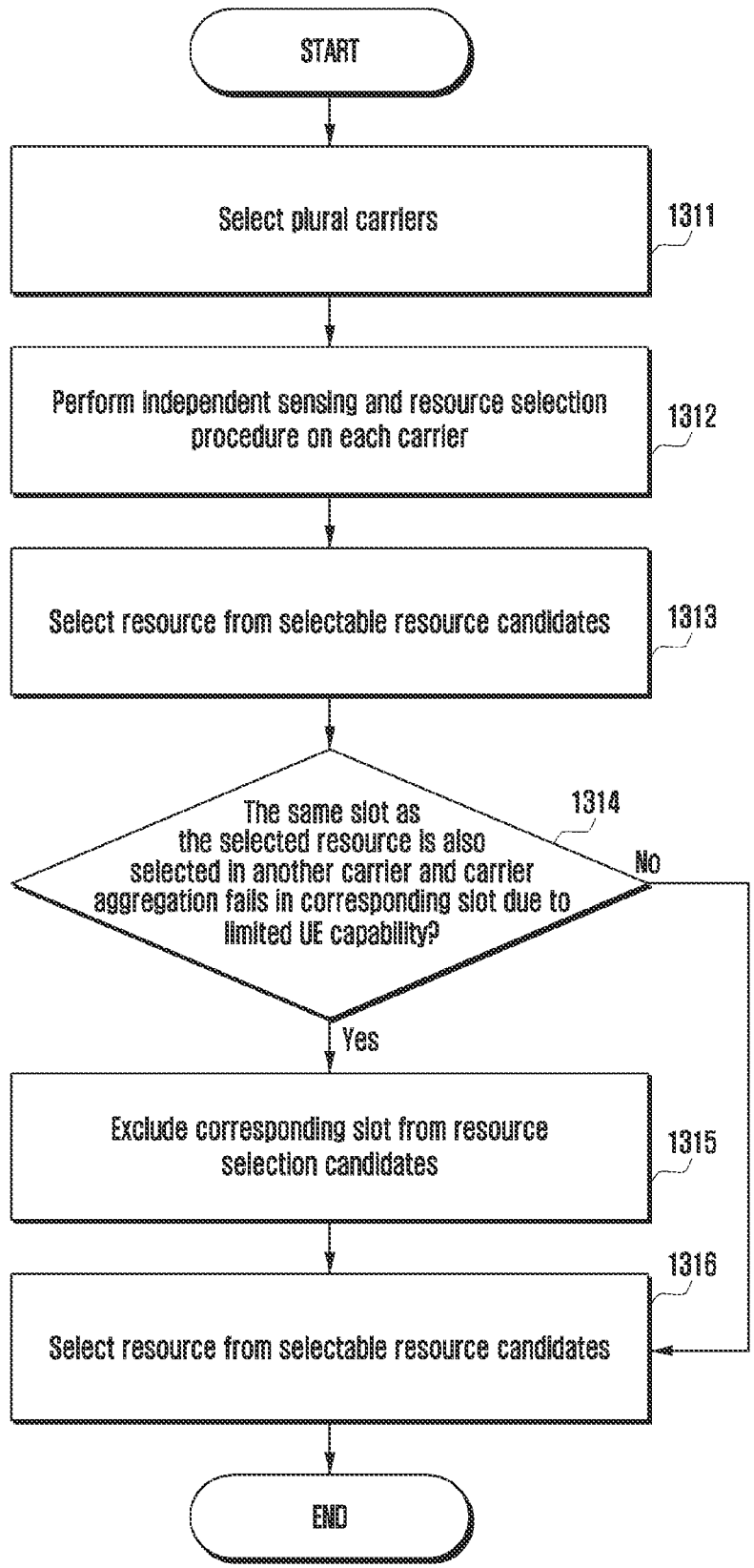
FIG. 13B is a flowchart for a method for a UE to select and allocate resources in consideration of the limited. UE capability when carrier aggregation is performed in the sidelink according to another embodiment of the disclosure.

FIG. 13B is a flowchart for a method for a UE to select and allocate resources in consideration of the limited UE capability when carrier aggregation is performed in the sidelink according to the above method proposed in the third embodiment.

First, at step 1311, the UE selects a plurality of carriers to perform carrier aggregation. For a detailed operation of selecting a plurality of carriers, refer to the first embodiment. Next, at step 1312, the UE may perform an independent sensing and resource selection procedure (mode 2) on each carrier. At step 1313, the UE selects a resource from the selectable resource candidates. Next, at step 1314, the UE determines whether the same slot as the resource selected in the corresponding carrier is selected in another carrier according to the method proposed in the third embodiment and carrier aggregation is possible in the corresponding slot in consideration of the limited UE capability. Upon determining that carrier aggregation is possible, the UE proceeds to step 1316 and performs resource transmission over the selected resource. On the other hand, upon determining at step 1314 that carrier aggregation is not possible, the UE proceeds to step 1315 and performs resource reselection to change the location of the slot. Finally, at step 1316, the UE performs resource transmission over the selected resource.

Referring to the third embodiment, when the location of the slot is changed through resource reselection at step 1315, resource reselection may be determined by priority. Referring to the third embodiment, for performing the procedure of changing the location of the slot through resource reselection at step 1306, considerations such as sidelink slot structure and sidelink channel configuration in another carrier, and performing TX chain switching have been described with reference to FIGS. 10A to 10D, and additional UE operations possible in this case have been presented through methods 1/2/3 and related examples have been described with reference to FIGS. 12A and 12B. Note that the procedure of resource reselection at step 1306 may be not performed according to methods 1/2/3. Further, it is noted that when methods 1/2/3 are considered, the utilization efficiency of resources can be improved.

Figure 14:
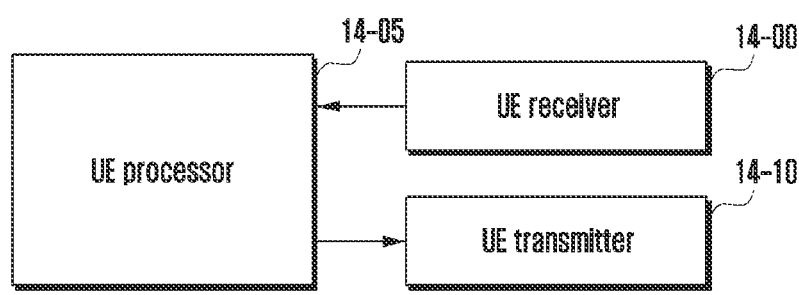
FIG. 14 is a block diagram illustrating the internal structure of a UE according to an embodiment of the disclosure.
Figure 15:
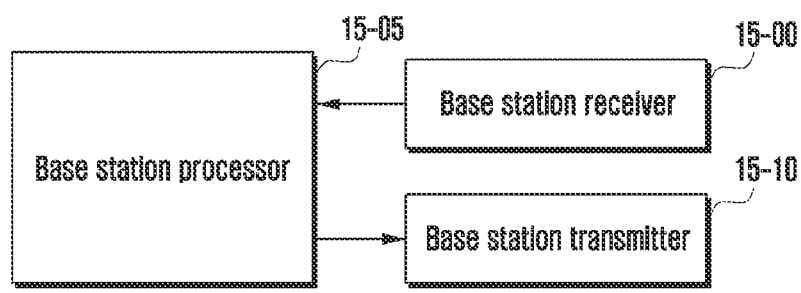
FIG. 15 is a block diagram illustrating the internal structure of a base station according to an embodiment of the disclosure.

To carry out the above embodiments of the disclosure, the UE and the base station each including a transmitter, a receiver, and a processor are shown in FIG. 14 and FIG. 15, respectively. In the above various embodiments, a method for the UE to perform sensing and resource selection in the sidelink is shown; to carry out this, the receiver, processor, and transmitter of the base station and the UE should operate according to the embodiments, respectively.

Specifically, FIG. 14 is a block diagram illustrating the internal structure of a UE according to an embodiment of the disclosure. As shown in FIG. 14, the UE of the disclosure may include a UE receiver 1400, a UE transmitter 1404, and a UE processor 1402.

The UE receiver 1400 and the UE transmitter 1404 may be collectively referred to as a transceiver in embodiments of the disclosure. The transceiver may transmit and receive a signal to and from a base station. The signal may include control information and data. To this end, the transceiver may include an RF transmitter for up-converting the frequency of a signal to be transmitted and amplifying the signal, and an RF receiver for low-noise amplifying a received signal and down-converting the frequency thereof. In addition, the transceiver may receive a signal through a radio channel and output it to the UE processor 1402, and transmit a signal output from the UE processor 1402 through a radio channel. The UE processor 1402 may control a series of processes so that the UE can operate according to the various embodiments of the disclosure described above. For example, the UE processor (controller) 1402 may be configured to: identify a first carrier and a second carrier for sidelink communication; identify whether at least one symbol included in a slot within a resource selection window of the first carrier is selected for the second carrier; select at least one resource for transmitting sidelink data from the resource selection window based on whether at least one symbol is selected for the second carrier; and control the transceiver (1400, 1404) to transmit the sidelink data to a second UE through the selected at least one resource.

FIG. 15 is a block diagram illustrating the internal structure of a base station according to an embodiment of the disclosure. As shown in FIG. 15, the base station of the disclosure may include a base station receiver 1501, a base station transmitter 1505, and a base station processor 1503. The base station receiver 1501 and the base station transmitter 1505 may be collectively referred to as a transceiver in embodiments of the disclosure. The transceiver may transmit and receive a signal to and from a UE. The signal may include control information and data. To this end, the transceiver may include an RE transmitter for up-converting the frequency of a signal to be transmitted and amplifying the signal, and an RF receiver for low-noise amplifying a received signal and down-converting the frequency thereof. In addition, the transceiver may receive a signal through a radio channel and output it to the base station processor 1503, and transmit a signal output from the UE processor 1503 through a radio channel. The base station processor 1503 may control a series of processes so that the base station can operate according to the various embodiments of the disclosure described above.

Meanwhile, the embodiments of the disclosure disclosed in the present specification and drawings are presented as specific examples to easily explain the technical contents of the disclosure and help the understanding of the disclosure, and are not intended to limit the scope of the disclosure. That is, it will be apparent to those of ordinary skill in the art to which the disclosure pertains that other modifications based on the technical spirit of the disclosure can be carried out. In addition, the above embodiments may be operated in combination as needed. For example, parts of the embodiments of the disclosure may be combined with each other to operate a base station and a terminal.

The invention claimed is:

1. A method of a first terminal in a wireless communication system, the method comprising:
   identifying a first carrier and a second carrier for a sidelink communication;
   identifying that a first symbol part of a slot within a resource selection window of the first carrier is selected by the first terminal for the second carrier and a second symbol part of the slot is not selected for the second carrier;
   excluding the first symbol part from selectable resource candidates in the resource selection window;
   determining whether to include the second symbol part in the selectable resource candidates, based on a transmission chain switching time of the first terminal;
   selecting at least one resource for transmitting sidelink data in the resource selection window based on the selectable resource candidates; and transmitting, to a second terminal, the sidelink data through the selected at least one resource.

2. The method of claim 1, wherein, in case that at least one gap symbol of the second carrier covers the transmission chain switching time, the second symbol part is included in the selectable resource candidates.

3. The method of claim 1, wherein, in case that at least one gap symbol of the second carrier does not cover the transmission chain switching time, the second symbol part is excluded from the selectable resource candidates.

4. The method of claim 2, wherein, in case that the at least one resource selected for transmitting the sidelink data includes the second symbol part, sidelink control information (SCI) indicating the second symbol part is transmitted to the second terminal.

5. The method of claim 1, wherein the first terminal has a limited capability that does not support carrier aggregation of the first carrier and the second carrier within the slot.

6. The method of claim 1, wherein the transmission chain switching time is based on at least one of:
a frequency range in which a transmission chain switching occurs,
a numerology of the second carrier, or
whether the transmission chain switching is an in-band transmission chain switching or an inter-band transmission chain switching.

7. The method of claim 1, further comprising
receiving, from a base station, a resource pool configuration indicating that a reference signal received power (RSRP) of a physical sidelink shared channel (PSSCH) is not used for sidelink resource selection.

8. A first terminal in a wireless communication system, comprising:
a transceiver; and
a controller configured to:
identify a first carrier and a second carrier for a sidelink communication,
identify that a first symbol part of a slot within a resource selection window of the first carrier is selected by the first terminal for the second carrier and a second symbol part of the slot is not selected for the second carrier,
exclude the first symbol part from selectable resource candidates in the resource selection window,
determine whether to include the second symbol part in the selectable resource candidates, based on a transmission chain switching time of the first terminal,
select at least one resource for transmitting sidelink data in the resource selection window based on the selectable resource candidates, and
transmit, to a second terminal via the transceiver, the sidelink data through the selected at least one resource.

9. The first terminal of claim 8, wherein, in case that at least one gap symbol of the second carrier covers the transmission chain switching time, the second symbol part is included in the selectable resource candidates.

10. The first terminal of claim 8, wherein, in case that at least one gap symbol of the second carrier does not cover the transmission chain switching time, the second symbol part is excluded from the selectable resource candidates.

11. The first terminal of claim 9, wherein, in case that the selected at least one resource for transmitting the sidelink data includes the second symbol part, sidelink control information (SCI) indicating the second symbol part is transmitted to the second terminal.

12. The first terminal of claim 8, wherein the first terminal has a limited capability that does not support carrier aggregation of the first carrier and the second carrier within the slot.

13. The first terminal of claim 8, wherein the transmission chain switching time is based on at least one of:
a frequency range in which a transmission chain switching occurs,
a numerology of the second carrier, or
whether the transmission chain switching is an in-band transmission chain switching or an inter-band transmission chain switching.

14. The first terminal of claim 8, wherein the controller is further configured to receive, from a base station via the transceiver, a resource pool configuration indicating that a reference signal received power (RSRP) of a physical sidelink shared channel (PSSCH) is not used for sidelink resource selection.

* * * * *